US011739000B2

(12) United States Patent
Neto et al.

(10) Patent No.: US 11,739,000 B2
(45) Date of Patent: Aug. 29, 2023

(54) PREPARATION OF $SIO_2$—$TIO_2$ COMPOSITE AEROGELS AND $SIO_2$@$TIO_2$ CORE-SHELL AEROGELS WITH HIGH THERMAL STABILITY AND ENHANCED PHOTOCATALYSIS

(71) Applicants: Lawrence Livermore National Security, LLC, Livermore, CA (US); University of Sao Paulo, Sao Paulo (BR)

(72) Inventors: Elias Paiva Ferreira Neto, Jardim (BR); Marcus A. Worsley, Hayward, CA (US); Ubirajara Pereira Rodrigues Filho, São Carlos (BR)

(73) Assignees: Lawrence Livermore National Security, LLC, Livermore, CA (US); University of Sao Paulo, Sao Paulo (BR)

( * ) Notice: Subject to any disclaimer, the term of this patent is extended or adjusted under 35 U.S.C. 154(b) by 666 days.

(21) Appl. No.: 16/790,498

(22) Filed: Feb. 13, 2020

(65) Prior Publication Data

US 2020/0180969 A1 Jun. 11, 2020

Related U.S. Application Data

(63) Continuation-in-part of application No. PCT/US2018/046333, filed on Aug. 10, 2018.

(Continued)

(51) Int. Cl.

*C01B 33/158* (2006.01)
*B01J 13/00* (2006.01)

(Continued)

(52) U.S. Cl.

CPC ....... *C01B 33/1585* (2013.01); *B01J 13/0091* (2013.01); *C01G 23/053* (2013.01); *B82Y 30/00* (2013.01); *C01P 2004/64* (2013.01)

(58) Field of Classification Search

CPC . C01B 33/1585; B01J 13/0091; B01J 21/063; B01J 21/08; B01J 35/004;

(Continued)

(56) References Cited

U.S. PATENT DOCUMENTS

| | | | |
|---|---|---|---|
| 5,935,895 | A | 8/1999 | Baiker et al. |
| 6,632,771 | B1 | 10/2003 | Maekawa et al. |

(Continued)

FOREIGN PATENT DOCUMENTS

| | | |
|---|---|---|
| CN | 101288835 A | 10/2008 |
| CN | 104477921 A | 4/2015 |

(Continued)

OTHER PUBLICATIONS

Feltrin et al., "Superfícies fotocatalíticas de titânia em substrates cerâmicos. Parte I: Síntese, estrutura e fotoatividade," Ceramica, vol. 59, 2013, pp. 620-632.

(Continued)

*Primary Examiner* — Anthony J Zimmer
(74) *Attorney, Agent, or Firm* — Zilka-Kotab, P.C.

(57) ABSTRACT

According to one inventive concept, a method for forming an aerogel includes forming a $SiO_2$ gel, forming a mixture of the $SiO_2$ gel and a $TiCl_4$-derived precursor sol, wherein the $TiCl_4$ sol is comprised of $TiCl_4$ and a solvent, forming a $SiO_2/TiO_2$ wet gel, drying the $SiO_2/TiO_2$ wet gel, and heating the dried $SiO_2/TiO_2$ gel.

9 Claims, 14 Drawing Sheets

Related U.S. Application Data

(60) Provisional application No. 62/545,352, filed on Aug. 14, 2017.

(51) Int. Cl.
*C01G 23/053* (2006.01)
*B82Y 30/00* (2011.01)

(58) Field of Classification Search
CPC .... B01J 35/008; B01J 37/0236; B01J 37/036; C01G 23/053; B82Y 30/00; C01P 2004/64
See application file for complete search history.

(56) References Cited

U.S. PATENT DOCUMENTS

2006/0258757 A1 11/2006 Wakizaka et al.
2007/0119344 A1* 5/2007 Yeung .................. B01J 13/0091 106/287.34
2013/0136664 A1* 5/2013 Bono ................... B01J 35/1061 422/177

FOREIGN PATENT DOCUMENTS

JP 2005022897 A 1/2005
KR 20110085656 A * 7/2011 ............ B01J 21/063

OTHER PUBLICATIONS

Zu et al., "Silica-Titania Composite Aerogel Photocatalysts by Chemical Liquid Deposition of Titania onto Nanoporous Silica Scaffolds," Applied Materials and Interfaces, vol. 7, pp. 5400-5409.
He et al., "Thermally stable SiO2-doped mesoporous anatase TiO2 with large surface area and excellent photocatalytic activity," Journal of Colloid and Interface Science, vol. 344, 2010, pp. 382-389.
Li et al., "Nanoscale effects of silica particle supports on the formation and properties of TiO2 nanocatalysts," Nanoscale, vol. 5, 2013, pp. 5854-5862.
Ghosal et al., "Controlling Atomic Layer Deposition of TiO2 in Aerogels through Surface Functionalization," Chemistry of Materials, vol. 21, No. 9, 2009, pp. 1989-1992.
International Preliminary Examination Report from PCT Application No. PCT/US2018/046333, dated Feb. 27, 2020.
Chen et al., "Photocatalytic activity of epoxide sol-gel derived titania transformed into nanocrystalline aerogel powders by supercritical drying,"Journal of Molecular Catalysis A: Chemical, vol. 255, 2006, pp. 260-268.
Schafer et al., "Synthesis of inorganic aerogels via rapid gelation using cholride precursors," RSC Advances, vol. 3, 2013, pp. 15263-15272.
Hamann et al., "Atomic Layer Deposition of TiO2 on Aerogel Templates: New Photoanodes for Dye-Sensitized Solar Cells," Journal of Physical Chemistry, vol. 112, 2008, pp. 10303-10307.
Okada et al., "Effect of Silica Additive on the Anatase-to-Rutile Phase Transition," Journal of the American Chemical Society, vol. 84, No. 7, 2001, pp. 1591-1596.
International Search Report and Written Opinion from PCT Application No. PCT/US2018/046333, dated Oct. 12, 2018.

* cited by examiner

FIG. 5A: $SiO_2@TiO_2$ Aerogel (TID route)
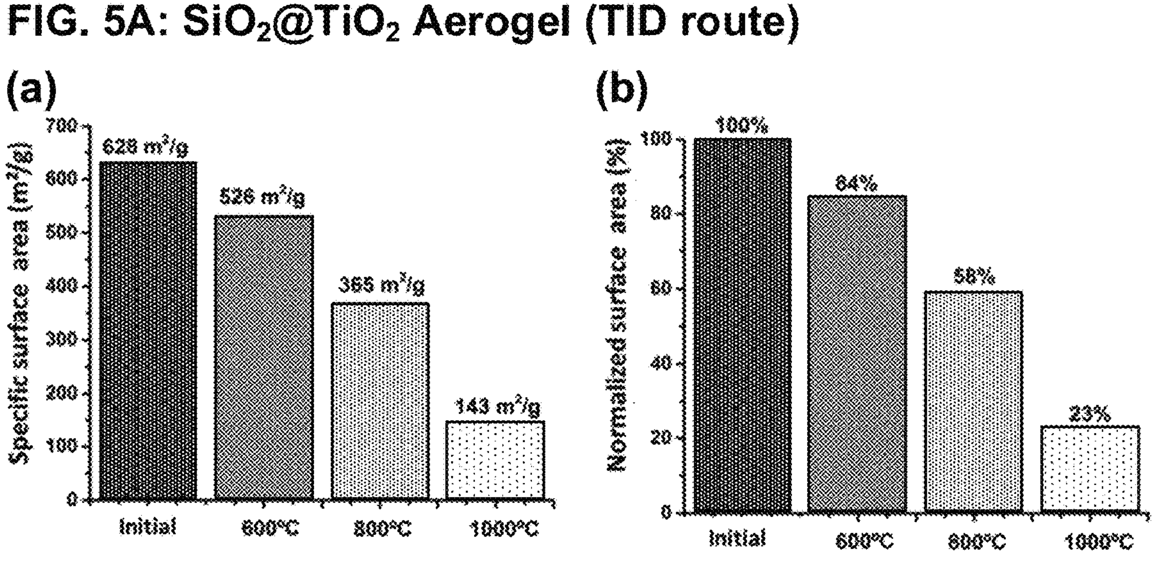
FIG. 5B: $SiO_2/TiO_2$ Aerogel (EAG route)
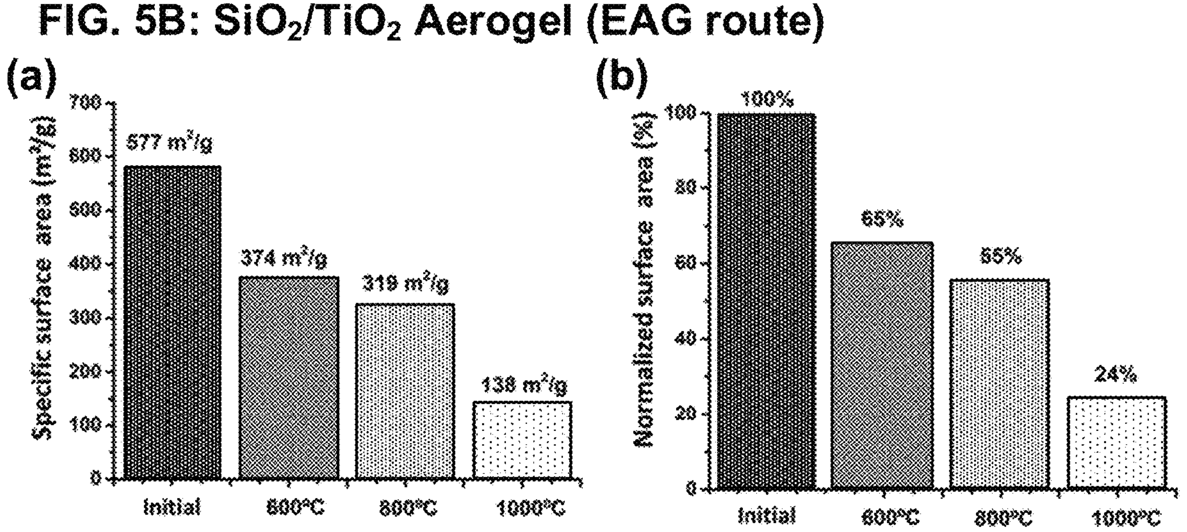
FIG. 5C: $TiO_2$ Aerogel
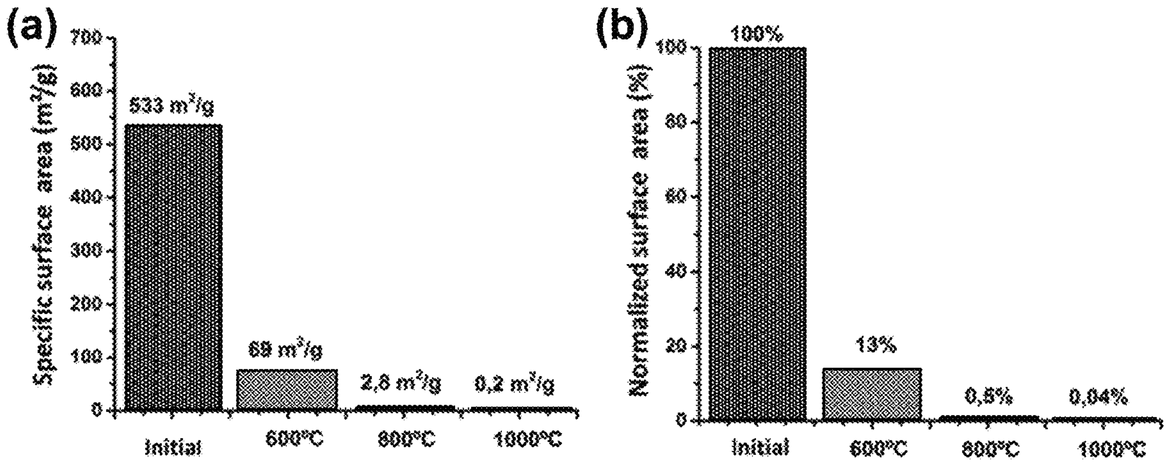

PREPARATION OF $SiO_2$—$TiO_2$ COMPOSITE AEROGELS AND $SiO_2$@$TiO_2$ CORE-SHELL AEROGELS WITH HIGH THERMAL STABILITY AND ENHANCED PHOTOCATALYSIS

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to aerogels, and more particularly, this invention relates to thermally stable $SiO_2$—$TiO_2$ composite and $SiO_2$@$TiO_2$ core-shell aerogel photocatalysts.

BACKGROUND $TiO_2$ is a metal oxide semiconductor that is of interest for photocatalysis and other uses. However, efforts to maximize photocatalytic activity, in particular high surface area, good crystallinity and controlled crystalline phase composition, have heretofore been difficult to achieve.

Aerogels are a class of nanoporous materials prepared by the controlled drying of wet gels formed by sol-gel derived inorganic or organic crosslinked networks. Typically, supercritical drying is employed. Controlled drying avoids shrinkage and pore collapse, preserving the fine pore network structure in the dried material, and thus resulting in a highly porous, low-density solid.

Owing to their unique textural and structural properties, $TiO_2$ aerogels are interesting choices for development of high performance photocatalysts. Preparation of titania aerogels is most often carried out by the controlled hydrolysis and polycondensation of titanium alkoxides precursors in alcohol solvents, yielding monolithic alcogels that are converted into aerogels after subsequent supercritical drying. However, titanium alkoxide precursors exhibit some disadvantages including high cost, lower commercial availability, difficult storage, and necessity of precise control of synthetic parameters to obtain good quality monolithic gels.

Moreover, a significant drawback of existing titania nanomaterials is their lack of thermal stability, which leads to large decrease of surface area and porosity, particle sintering and anatase-to-rutile phase transformation upon annealing. Such behavior limits the use of titania aerogels for high temperature applications and affects its use in photocatalysis as well, because post-synthesis thermal treatments are often required to crystallize the amorphous sol-gel derived titania (preferably into anatase structure) and or/to reduce the number of crystal lattice defects, which presence is detrimental to the material photoactivity. Furthermore, as calcination above 600° C. in air causes titania dioxide to undergo anatase-to-rutile phase transformation, formation of anatase-based nanomaterial with high thermal stability (e.g., up to 1000° C.) has proven challenging.

SUMMARY

According to one inventive concept, a method for forming an aerogel includes forming a $SiO_2$ gel, forming a mixture of the $SiO_2$ gel and a $TiCl_4$-derived precursor sol, wherein the $TiCl_4$ sol is comprised of $TiCl_4$ and a solvent, forming a $SiO_2/TiO_2$ wet gel, drying the $SiO_2/TiO_2$ wet gel, and heating the dried $SiO_2/TiO_2$ gel.

According to another inventive concept, a product includes a $SiO_2$—$TiO_2$ composite aerogel having a plurality of $SiO_2$ and $TiO_2$ particles.

According to yet another inventive concept, a product includes a $SiO_2$@$TiO_2$ core-shell aerogel having a plurality of $SiO_2$@$TiO_2$ particles, where a core of each of the particles comprises $SiO_2$ and a shell of each of the particles comprises $TiO_2$.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 5A part (a) is a plot of specific surface area in absolute values for samples of $SiO_2$@$TiO_2$ core-shell aerogel (TID route) after thermal annealing at various temperatures, according to one inventive concept.

FIG. 5A part (b) is a plot of specific surface area as normalized percentage values for samples of $SiO_2$@$TiO_2$ core-shell aerogel (TID route) after thermal annealing at various temperatures, according to one inventive concept.

FIG. 5B part (a) is a plot of specific surface area in absolute values for samples of $SiO_2$—$TiO_2$ composite aerogel (EAG route) after thermal annealing at various temperatures, according to one inventive concept.

FIG. 5B part (b) is a plot of specific surface area as normalized percentage values for samples of $SiO_2$—$TiO_2$ composite aerogel (EAG route) after thermal annealing at various temperatures, according to one inventive concept.

FIG. 5C part (a) is a plot of specific surface area in absolute values for samples of bare $TiO_2$ aerogel after thermal annealing at various temperatures, according to one inventive concept.

FIG. 5C part (b) is a plot of specific surface area as normalized percentage values for samples of bare $TiO_2$ aerogel after thermal annealing at various temperatures, according to one inventive concept.

FIG. 6D part (b) is a schematic drawing of the crystallite growth of $SiO_2$—$TiO_2$ composite aerogel (EAG route), according to one inventive concept.

FIG. 6D part (c) is a schematic drawing of the crystallite growth of $TiO_2$ aerogel, according to one inventive concept.

DETAILED DESCRIPTION

Figure 1A:
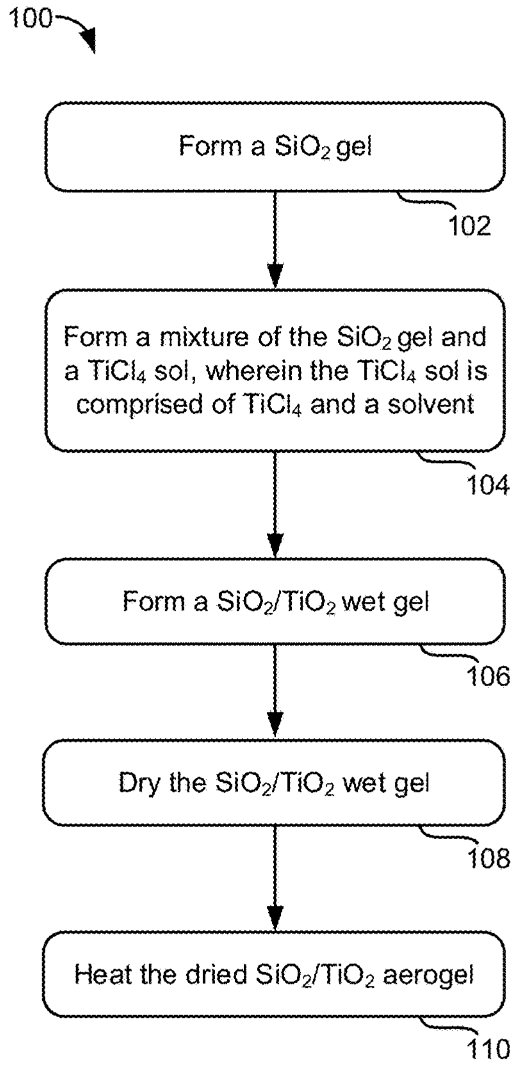
FIG. 1A is flowchart of a method, according to one inventive concept.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" when combined with a value refers to plus and minus 10% of the reference value. For example, a length of about 1 μm refers to a length of 1 μm±0.1 μm.

It is also noted that, as used in the specification and the appended claims, wt % is defined as the percentage of weight of a particular component is to the total weight of the mixture. Moreover, mol % is defined as the percentage of moles of a particular component is to the total moles of the mixture.

In one general inventive concept, a method for forming an aerogel includes forming a $SiO_2$ gel, forming a mixture of the $SiO_2$ gel and a $TiCl_4$-derived precursor sol, wherein the $TiCl_4$ sol is comprised of $TiCl_4$ and a solvent, forming a $SiO_2$/$TiO_2$ wet gel, drying the $SiO_2$/$TiO_2$ wet gel, and heating the dried $SiO_2$/$TiO_2$ gel.

In another general inventive concept, a product includes a $SiO_2$—$TiO_2$ composite aerogel having a plurality of $SiO_2$ and $TiO_2$ particles.

In yet another general inventive concept, a product includes a $SiO_2$@$TiO_2$ core-shell aerogel having a plurality of $SiO_2$@$TiO_2$ particles, where a core of each of the particles comprises $SiO_2$ and a shell of each of the particles comprises $TiO_2$.

A list of acronyms used in the description is provided below.

$S_{BET}$ Specific surface area (Brunauer, Emmett and Teller)
C Celsius
$CO_2$ carbon dioxide
CV Crystal violet
DMF dimethylformamide
EAG epoxide-assisted gelation
h hour(s)
$H_2O$ water
$K_{obs}$ First-order kinetic constant
RhB Rhodamine B
$SiO_2$ silicon dioxide, silica
TID thermo-induced deposition
$TiCl_4$ titanium tetrachloride
$TiO_2$ titanium dioxide, titania
μL microliter
XRF X-ray Fluorescence spectroscopy Owing to their highly porous nature and unique structural properties, $TiO_2$ aerogels prepared by sol-gel methodology and supercritical drying are of interest for development of high performance photocatalysts for environmental remediation and solar energy conversion processes. Nevertheless, controlled formation of nanocrystalline $TiO_2$ aerogels has heretofore proven challenging, as the required crystallization by post-synthesis high temperature thermal treatments may lead to uncontrolled crystallite growth and sintering, as well as irreversible anatase-to-rutile phase transformation, structural changes which are highly detrimental to photocatalytic performance.

To address such drawbacks, various inventive concepts described herein include processes for fabrication of $SiO_2$—$TiO_2$ composite aerogels and $SiO_2$@$TiO_2$ core-shell aerogels using $TiCl_4$ precursor. For example, described herein are two novel $TiCl_4$-based non-alkoxide sol-gel routes for the synthesis of $SiO_2$/$TiO_2$ nanocomposite aerogels. In the first route, $SiO_2$—$TiO_2$ composite aerogels are obtained by epoxide-assisted gelation EAG of $TiCl_4$/solvent solution in the presence of $SiO_2$ aerogel particles. In the second route, a $TiCl_4$/solvent solution may be used to prepare $SiO_2$@$TiO_2$ core-shell aerogels by a facile one-step thermo-induced deposition (TID) of $TiO_2$ on silica wet gel supports. After controlled drying, e.g., in supercritical $CO_2$, high surface area silica-titania aerogels are obtained as fragile monoliths or fine powders (EAG route) or as crack-free monoliths (TID route).

Various inventive concepts described herein may be used to fabricate silica-titania ($SiO_2$/$TiO_2$) aerogels that display excellent structural and textural properties including high surface area, large pore volume, and outstanding thermal stability upon high temperature annealing. Importantly, the materials have greater thermal stability than $TiO_2$ aerogels, and in some approaches, demonstrate anatase nanocrystals (9-15 nm), robust mesoporous structure, and high surface area even after thermal treatment at 1000° C. Such improved structural properties resulted in further improvement of photocatalytic activity of $SiO_2$/$TiO_2$ aerogels after high temperature annealing (to as high as 1000° C.). Without wishing to be bound to any theory, it is believed that the high photocatalytic performance of the $SiO_2$/$TiO_2$ aerogels formed by methods described herein may be due to the better photocatalytic activity of the anatase phase of $TiO_2$ compared to other $TiO_2$ crystalline phases, as well as excellent structural and textural properties of silica-titania aerogels, which contrast significantly with those of unsupported $TiO_2$ aerogels.

While core-shell aerogels prepared by thermo-induced deposition methods show higher and unprecedented thermal stability, epoxide-assisted gelation methods according to various approaches offer greater control over phase composition, allowing preparation of highly photoactive, e.g., anatase/rutile bicrystalline silica-titania nanocomposite aerogels. The improved structural properties achieved result in an increase of photocatalytic activity of silica-titania aerogels after high temperature annealing at about 1000° C. Such unusually high thermal stabilities outperform those shown by previously reported titania and silica-titania materials, representing a significant advance on the design of thermally stable photocatalysts for applications that require the catalyst to undergo high temperature processing or endure extreme operating conditions.

In various approaches described herein, two novel $TiCl_4$-based sol-gel routes for the synthesis of silica-titania nanostructured aerogels are presented. In the first route, composite $SiO_2$—$TiO_2$ aerogels are obtained by EAG of $TiCl_4$/DMF solution in the presence $SiO_2$ aerogel particles. Additionally, the same $TiCl_4$/DMF solution is employed to prepare $SiO_2$@$TiO_2$ aerogels by a facile one-step TID of $TiO_2$ on silica wet gel supports. After controlled drying in supercritical $CO_2$, high surface area silica-titania crack-free aerogel monoliths are obtained. The prepared aerogels show photocatalytic activity higher than pure $TiO_2$ aerogels, as well as outstanding thermal stability, preserving anatase nanocrystals (e.g., 9-15 nm) even after thermal treatment at 1000° C. This improved structural stability results in an additional increase in photocatalytic activity of $SiO_2$/$TiO_2$ aerogels after high temperature annealing (to as high as 1000° C.), which in sharp contrast to the behavior of unsupported $TiO_2$ aerogels. Furthermore, it is important to note that while previously reported silica-titania based photocatalysts show improved thermal stability compared to bare titania samples, temperatures higher than 700-900° C. still result in decreased photoactivity in such prior photocatalysts, while in the case of the silica-titania aerogels described herein a remarkable increase in photocatalytic activity is observed upon 1000° C. annealing, thus highlighting their unique nature as thermal stable aerogel photocatalysts.

FIG. 1A shows a method 100 for forming a $SiO_2$/$TiO_2$ aerogel, in accordance with one embodiment. As an option, the present method 100 may be implemented to construct structures such as those shown in the other FIGS. described herein. Of course, however, this method 100 and others presented herein may be used to form structures for a wide variety of devices and/or purposes which may or may not be related to the illustrative embodiments listed herein. Further, the methods presented herein may be carried out in any desired environment. Moreover, more, or less operations than those shown in FIG. 1A may be included in method 100, according to various embodiments. It should also be noted that any of the aforementioned features may be used in any of the embodiments described in accordance with the various methods.

In one inventive concept described herein, a method 100 for forming an aerogel includes operation 102 of forming a $SiO_2$ gel.

Operation 104 of method 100 includes forming a mixture of the $SiO_2$ gel and a $TiCl_4$-derived precursor sol. The $TiCl_4$-derived precursor sol includes $TiCl_4$ and a solvent. In some approaches, the solvent may include a mixture of dimethylformamide and water. The $TiCl_4$ sol includes $TiCl_4$ and a solvent. This and other approaches described herein may employ solvents used in conventional sol-gel processes, such as dimethylformamide (DMF), dimethylsulfoxide (DMSO), tetrahydrofuran (THF), etc. A preferred solvent for this step is DMF with a small amount of water. The concentration of $TiCl_4$ may vary but $H_2O$:$TiCL_4$ ratio is preferably maintained at a ratio of 6:1. The dispersion may be agitated for a period of time, e.g., greater than 6 h. In a preferred approach, the dispersion may be subjected to magnetic stirring for about 24 h. The operation 104 of forming of the $TiCl_4$ sol may be used in this and other embodiments described herein.

Operation 106 includes forming a $SiO_2$/$TiO_2$ wet gel.

Next, the gel may be washed with a solvent. In a preferred approach, the gel is washed with DMF, ethanol, and acetone. Again, however, solvents used for washing in conventional sol-gel processes may be used in the washing step of this and other approaches described herein.

Operation 108 includes drying the $SiO_2$/$TiO_2$ wet gel. After washing, supercritical drying may be performed on the gel to convert the wet gel into an aerogel. In some approaches, the drying may include supercritical carbon dioxide drying. Supercritical drying techniques and materials used in conventional sol-gel processing may be used in the drying step in this and other approaches described herein. In one approach, the gel is dried in supercritical carbon dioxide ($CO_2$). Supercritical drying using other supercritical fluids (e.g., ethanol, isopropanol, etc.) may be performed in other approaches.

Operation 110 includes heating the dried $SiO_2$/$TiO_2$ gel for crystallizing titania in photocatalytic active crystalline phases (preferably anatase nanocrystals).

After supercritical drying, a calcining step may be performed. In some approaches, the heating may be at a temperature in a range of about 600° C. to about 1000° C. under ambient air atmosphere.

Figure 1B:
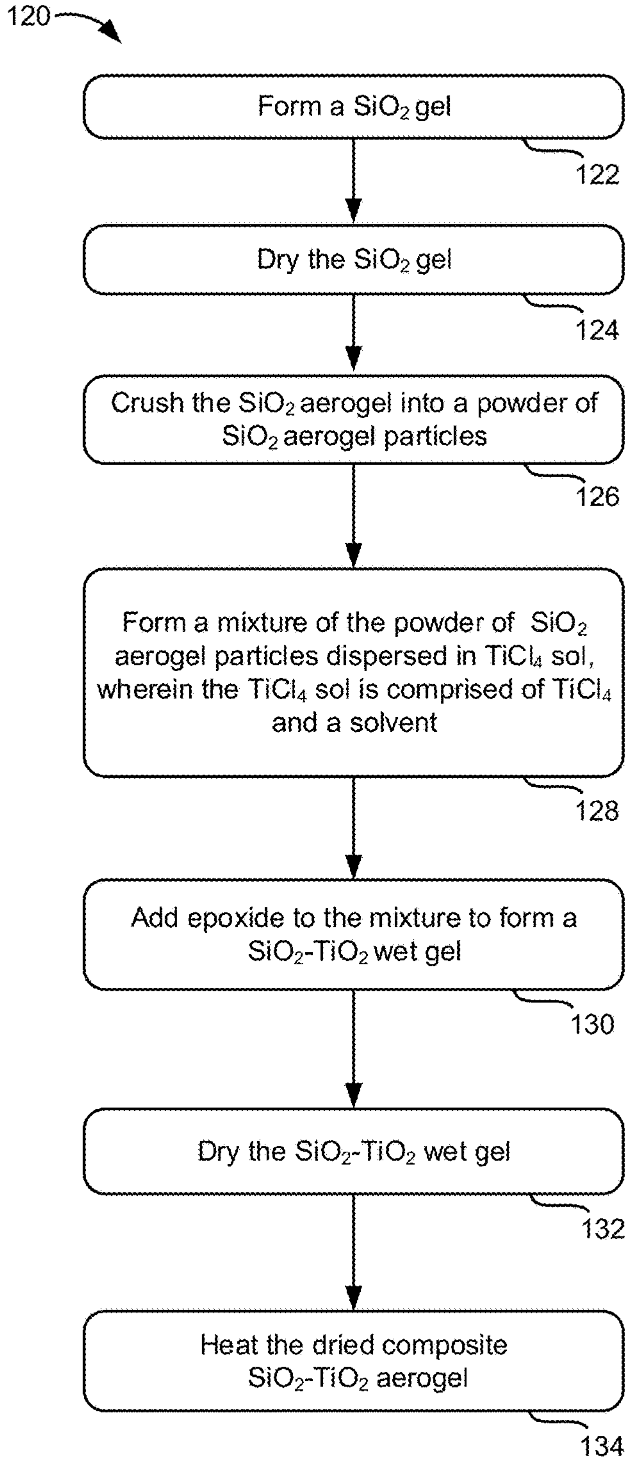
FIG. 1B is flowchart of a method, according to one inventive concept.

FIG. 1B shows a specific method 120 for forming a $SiO_2$—$TiO_2$ composite aerogel by epoxide-assisted synthesis, in accordance with one embodiment. As an option, the present method 120 may be implemented to construct structures such as those shown in the other FIGS. described herein. Of course, however, this method 120 and others presented herein may be used to form structures for a wide variety of devices and/or purposes which may or may not be related to the illustrative embodiments listed herein. Further, the methods presented herein may be carried out in any desired environment. Moreover, more, or less operations than those shown in FIG. 1B may be included in method 120, according to various embodiments. It should also be noted that any of the aforementioned features may be used in any of the embodiments described in accordance with the various methods.

In one inventive concept described herein, a method 120 for forming $SiO_2$—$TiO_2$ composite aerogels includes an epoxide-assisted gelation (EAG), in which $SiO_2$ dried aerogel powder (particles) may be dispersed in $TiCl_4$ sol.

According to method 120, the operations of forming a $SiO_2$ gel result in forming a powder of $SiO_2$ aerogel particles.

Operation 122 includes forming a $SiO_2$ wet gel.

Operation 124 includes drying the $SiO_2$ wet gel by supercritical drying method to form a $SiO_2$ aerogel. Processes of drying the $SiO_2$ wet gel are described herein for other approaches.

Operation 126 includes crushing the $SiO_2$ aerogel into a powder comprising $SiO_2$ aerogel particles. Methods for crushing the $SiO_2$ aerogel into a powder may include grinding with mortar and pestle, bath sonication, tip sonication, ball milling, orbital mixer, etc.

Operation 128 of method 120 includes forming a mixture of the powder of $SiO_2$ aerogel particles dispersed in $TiCl_4$ sol. The $TiCl_4$ sol includes $TiCl_4$ and a solvent, as described in inventive concepts herein.

Next, gelification (also referred to herein as gelation) is induced by addition of an epoxide. Operation 130 of method 120 includes forming the $SiO_2/TiO_2$ wet gel comprises adding epoxide to a mixture of $SiO_2$ aerogel particles dispersed in the $TiCl_4$ sol for gelation of the mixture.

A known epoxide may be used, e.g., an epoxide used in conventional sol-gel processes. Illustrative epoxides include, but are not limited to, propylene oxide, ethylene oxide, trimethylene oxide, dimethylene oxide, epichlorohydrin, etc. In a preferred approach, gelification is induced by a mixture of DMF and propylene oxide.

As described in method 100, drying techniques for forming an $SiO_2/TiO_2$ aerogel may be applied to method 120 of forming a $SiO_2$—$TiO_2$ composite aerogel. Operation 132 of method 120 includes drying the $SiO_2$—$TiO_2$ wet gel following methods described herein. In some approaches of the EAG process for forming $SiO_2$—$TiO_2$ composite aerogels, a controlled supercritical drying results in high surface area silica-titania aerogels in the form of fragile monoliths or fine powders.

Moreover, as described for method 100 of forming a $SiO_2/TiO_2$ aerogel, heating the dried the $SiO_2$—$TiO_2$ composite aerogel of operation 134 of method 120 follows similar methods described herein.

In some approaches, the $SiO_2$—$TiO_2$ composite aerogel has plurality of silica (e.g., $SiO_2$) and titania (e.g., $TiO_2$) particles in the aerogel. In some approaches, the $SiO_2$—$TiO_2$ composite aerogels formed by an EAG process may have more titania than silica on weight basis; however relative amounts may vary. For example, a molar ratio of Ti:Si in the $SiO_2$—$TiO_2$ composite aerogel may be in a range of 10 Ti:1.5 Si to about 10 Ti:15 Si, but the ratios of various embodiments may be higher or lower than this range.

In some approaches, the chemical composition of $SiO_2$—$TiO_2$ composite aerogels (content of $SiO_2$ and $TiO_2$) may be tuned by adjusting the added amount of silica aerogel particles during the step of forming a mixture of $SiO_2$ aerogel particles dispersed in the $TiCl_4$ sol (operation 128 of method 120). Using such approach, $SiO_2$—$TiO_2$ composite aerogels may have $TiO_2$ content in a range of 50% to 90% in weight, as determined by X-ray Fluorescence (XRF) spectroscopy. In some approaches, adding more $SiO_2$ particles to increase $SiO_2$ content lowers the content of $TiO_2$ (e.g., less than 50% weight of $TiO_2$); however, the resulting gels may likely be too fragile for further processing.

In some approaches, the $SiO_2$—$TiO_2$ composite aerogel includes nanocrystallites of 90%, and ideally essentially pure, anatase phase $TiO_2$ nanocrystals supported on $SiO_2$ particles. In some approaches, an average crystalline size of anatase phase nanocrystallites in the shells may be less than 15 nanometers.

Figure 1C:
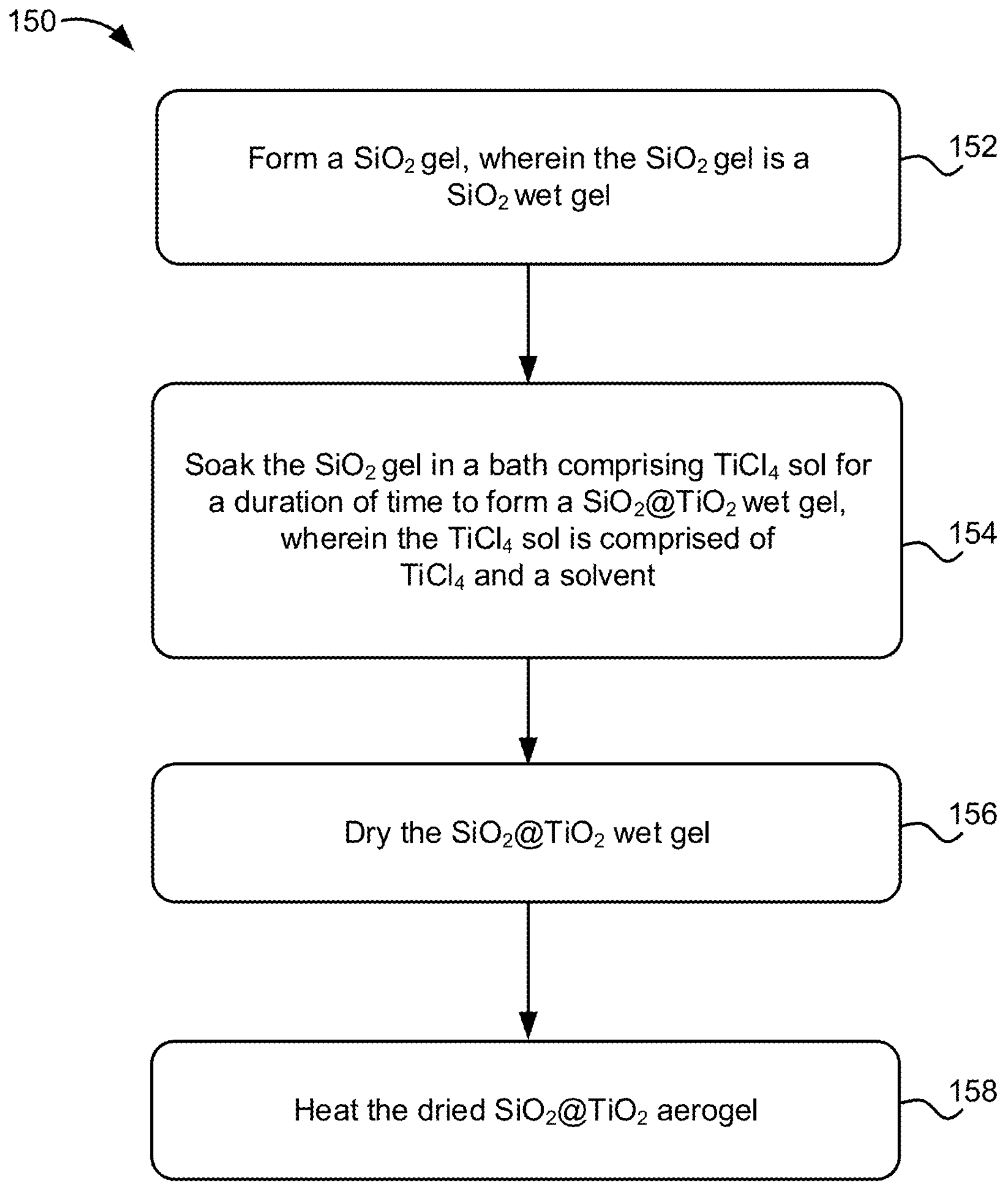
FIG. 1C is flowchart of a method, according to one inventive concept.

FIG. 1C shows a method 150 for forming a $SiO_2$@$TiO_2$ core-shell aerogel by a newly developed thermo-induced deposition (TID) method, in accordance with one embodiment. As an option, the present method 150 may be implemented to construct structures such as those shown in the other FIGS. described herein. Of course, however, this method 150 and others presented herein may be used to form structures for a wide variety of devices and/or purposes which may or may not be related to the illustrative embodiments listed herein. Further, the methods presented herein may be carried out in any desired environment. Moreover, more or less operations than those shown in FIG. 1C may be included in method 150, according to various embodiments. It should also be noted that any of the aforementioned features may be used in any of the embodiments described in accordance with the various methods.

According to another inventive concept, a method 150 includes forming a composite $SiO_2$@$TiO_2$ core-shell aerogel in one step by thermo-induced deposition (TID). Method 150 begins with operation 152 of forming a $SiO_2$ gel. In various approaches, the $SiO_2$ gel may be a $SiO_2$ wet gel.

According to method 150, the $TiO_2$ may be deposited on the $SiO_2$ in one step using $TiCl_4$ as a precursor during TID. Operation 154 includes soaking the $SiO_2$ wet gel in a bath comprising $TiCl_4$ sol. The bath may be heated for a duration of time. The $SiO_2$ wet gel may be modified by soaking the $SiO_2$ wet gel in $TiCl_4$ sol at a moderate temperature. Increased temperature is used to promote precipitation of $TiO_2$ induced by thermohydrolysis of $TiCl_4$ sol. For example, in preferred approaches, the soaking occurs at various temperatures, for example, initial soaking is at ambient temperature for about 24 hours, and then the temperature is raised so the soaking continues at an elevated temperature, e.g., above 65° C., preferably about 80° C.

The $TiCl_4$ sol includes $TiCl_4$ and a solvent. This and other approaches described herein may employ solvents used in conventional sol-gel processes. A preferred solvent for this step is DMF with a small amount of water.

Titania deposition on the $SiO_2$ wet gel involves soaking the $SiO_2$ wet gel in $TiCl_4$ sol for a period of time at ambient temperature. In some approaches $SiO_2$ wet gel is soaked at ambient temperature for greater than 6 hours. In preferred approaches, $SiO_2$ wet gel is soaked at ambient temperature for about 24 hours. Then the temperature is elevated from ambient temperature and the soaking of $SiO_2$ wet gel in $TiCl_4$ sol continues at a temperature above 65° C., preferably about 80° C. for a duration of greater than 6 h. In a preferred approach, $SiO_2$ wet gel continues soaking in $TiCl_4$ sol at 80° C. for about 24 h.

Next, the $SiO_2$@$TiO_2$ core-shell wet gel may be washed with a solvent. In a preferred approach, the gel is washed with DMF, ethanol and acetone. Again, however, solvents used for washing in conventional sol-gel processes may be used in the washing step of this and other approaches described herein.

After washing, operation 156 includes supercritical drying of the $SiO_2$@$TiO_2$ core-shell gel. Supercritical drying techniques and materials used in conventional sol-gel processing may be used in the drying step in this and other embodiments described herein. In one approach, the gel is dried in supercritical $CO_2$. Supercritical drying using other supercritical fluids (e.g., ethanol, isopropanol, etc.) may be also used in other approaches.

After supercritical drying, operation 158 includes a calcining step, preferably heating the dried $SiO_2$@$TiO_2$ core-shell gel at temperatures above 1000° C. Similar performance of the resulting structures is expected at temperatures reasonably above 1000° C., e.g., up to 1250° C.

In some approaches of the TID process for forming $SiO_2$@$TiO_2$ core-shell aerogels, a controlled supercritical drying may result in high surface area silica-titania aerogels in the form of crack-free monolithic structures.

According to method 150, the formed aerogel is a $SiO_2$@$TiO_2$ core-shell aerogel. In some approaches, the $SiO_2$@$TiO_2$ core-shell aerogels have a plurality of $SiO_2$ particles coated with $TiO_2$. The cores are $SiO_2$ particles and the corresponding shells are primarily or entirely $TiO_2$. In some approaches, the $SiO_2$@$TiO_2$ core-shell aerogels formed by a TID process may have more silica to titania on a weight basis; however relative amounts may vary. In some approaches, the chemical composition of $SiO_2$@$TiO_2$ core-shell aerogels (content of $SiO_2$ and $TiO_2$) may be tuned by adjusting the $TiCl_4$ concentration in precursor sol employed (operation 154 for method 150). Using such approach, it is possible to obtain $SiO_2$@$TiO_2$ core-shell aerogels may have $TiO_2$ content in a range of 20% to 65% in weight, as determined by XRF analysis.

In some approaches, the $SiO_2$@$TiO_2$ core-shell aerogel includes particles where the shells of the particles may include pure anatase phase $TiO_2$. In some approaches, an average crystalline size of anatase phase nanocrystallites in the shells may be less than 10 nanometers.

The foregoing methods have been found to provide titania-based materials with enhanced thermal stability. Without wishing to be bound by any theory, it is believed that the enhanced thermal stability is due in part to the unique fabrication techniques in conjunction with use of silica as a functional support for titania nanoparticles. Thermally stable $SiO_2$ supports may prevent uncontrolled crystallite growth and phase transformation of anatase nanoparticles by improving particle dispersion and by particle immobilization on the support via Si—O—Ti covalent attachment. For instance, such improved structural behavior of silica supported titania was observed on nanostructured $SiO_2$@$TiO_2$ core-shell particles prepared by sol-gel deposition of titania shells on $SiO_2$ spherical particles.

Figure 2:
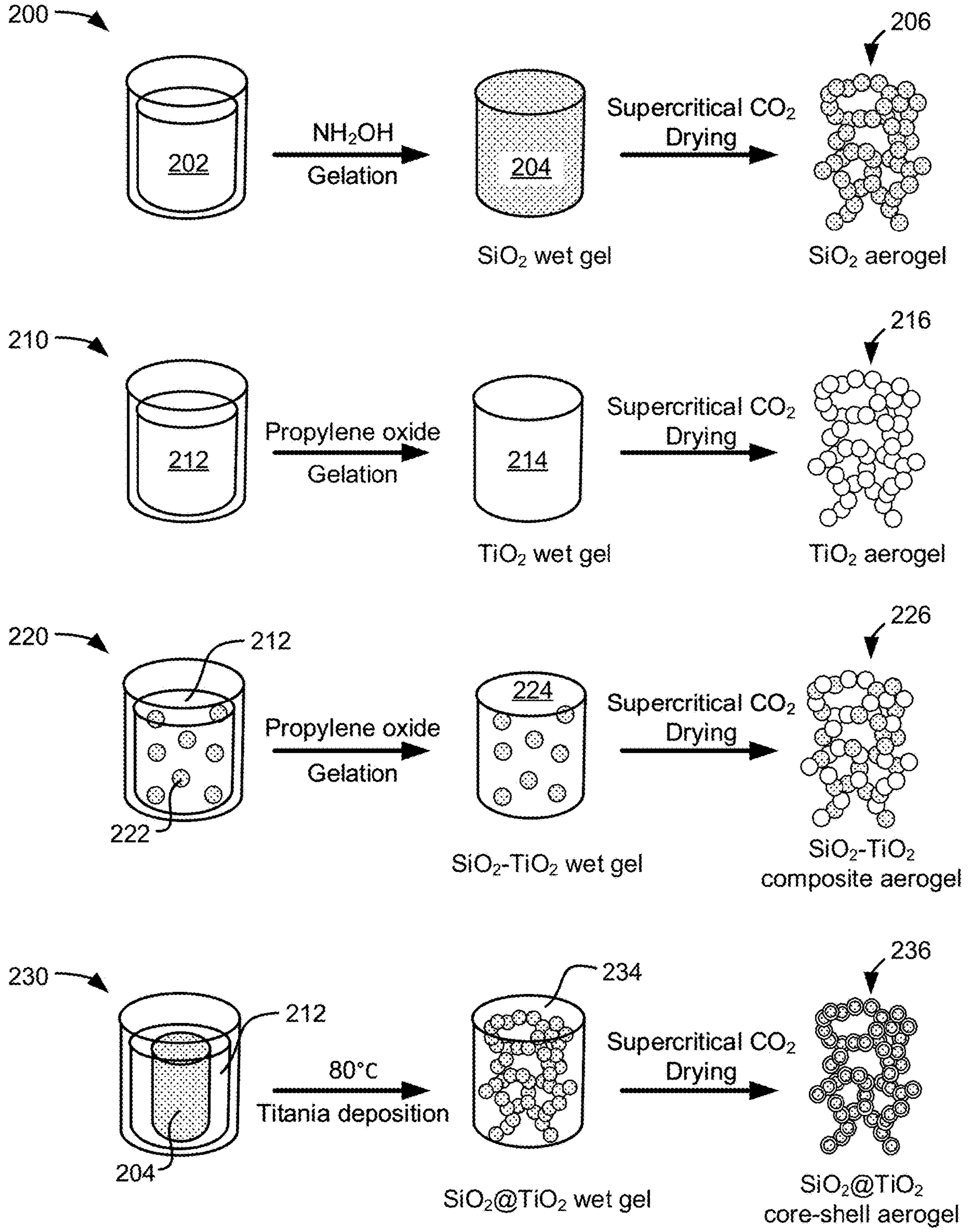
FIG. 2 is a series of schematic drawings of sol-gel synthesis of $SiO_2/TiO_2$ aerogels, according to various inventive concepts.

FIG. 2 illustrates several illustrative processes for sol-gel synthesis of $SiO_2/TiO_2$ aerogels.

Preparation of $SiO_2$ Aerogel

The illustrative process of $SiO_2$ aerogel preparation 200 is a comparative example involving gelation of a mixture 202 comprising TEOS:Ethanol:HCl in $NH_4OH$ to form a SiO2 wet gel 204. Supercritical $CO_2$ drying of a $SiO_2$ wet gel 204 forms a $SiO_2$ aerogel 206.

Preparation of $TiO_2$ Aerogel

The illustrative process of $TiO_2$ aerogel preparation 210 is a comparative example involving gelation of a titanium tetrachloride ($TiCl_4$) sol mixture 212 of $TiCl_4$+$H_2O$ in dimethylformamide (DMF) in propylene oxide to form a $TiO_2$ wet gel 214. Supercritical $CO_2$ drying of a $TiO_2$ wet gel 214 forms a $TiO_2$ aerogel 216. In various approaches, the $TiCl_4$ concentration may vary, and the water:$TiCl_4$ ratio is preferably maintained at a ratio of about 6:1.

Preparation of $SiO_2$—$TiO_2$ Composite Aerogel Following EAG Process

The illustrative process of $SiO_2$ dried aerogel plus $TiCl_4$ Epoxide assisted gelation (EAG) 220 involved $SiO_2$ dried aerogel powder (particles) 222 dispersed in $TiCl_4$ sol mixture 212 ($TiCl_4$+$H_2O$ in DMF). The mixture is combined, stirred, magnetic stirred, etc. for a selected time duration, preferably greater than 12 hours, e.g., about 18, 24, 48 hours, etc. Gelation may be induced by addition of DMF plus propylene oxide to form a $SiO_2$—$TiO_2$ wet gel 224. The $SiO_2$—$TiO_2$ wet gel 224 may be rinsed with DMF, ethanol, and acetone. Supercritical $CO_2$ drying of the $SiO_2$—$TiO_2$ wet gel 224 followed by calcination of the dried the $SiO_2$—$TiO_2$ wet gel 224 at a temperature effective to cause titania crystallization, e.g., 600° C., 800° C., 1000° C., etc. for a duration effective to result in calcination, such as several hours (e.g., 1, 2, 4, etc. hours), may result in formation of a $SiO_2$—$TiO_2$ aerogel 226.

Preparation of $SiO_2$@$TiO_2$ Core-Shell Aerogel Following TID Process

The illustrative process of a wet $SiO_2$ gel+$TiCl_4$ thermohydrolysis route 230 includes formation of a $SiO_2$ wet gel 204 that is modified by soaking the gel for a duration of time (for example, greater than 8 hours, e.g., 12, 24, 30, etc. hours) in a $TiCl_4$ sol mixture 212 ($TiCl_4$+$H_2O$ in DMF) at an elevated temperature above room temperature, for example greater than 30° C., preferably greater than 60° C., e.g., 80° C. In preferred approaches, the temperature is sufficient to promote precipitation of $TiO_2$ induced by thermohydrolysis of $TiCl_4$ sol. A formed $SiO_2$@$TiO_2$ core-shell wet gel 234 may be washed with DMF, ethanol, and acetone. Supercritical $CO_2$ drying of the $SiO_2$@$TiO_2$ core-shell wet gel 234 followed by calcination of the dried $SiO_2$@$TiO_2$ core-shell wet gel 234 at a temperature effective to cause titania crystallization, e.g., 600° C., 800° C., 1000° C. for several hours (e.g., 1, 2, 4, etc. hours), thereby forming a $SiO_2$@$TiO_2$ core-shell aerogel 236.

$SiO_2$@$TiO_2$ Core-Shell Wet Gels and Aerogels

Figure 3A:
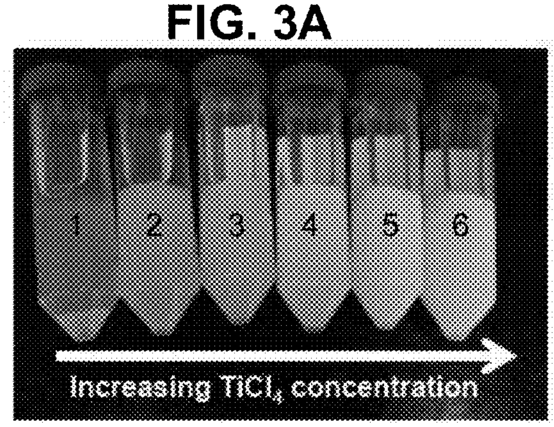
FIG. 3A is an image of $SiO_2$@$TiO_2$ core-shell wet gels of increasing $TiO_2$ concentrations, according to one inventive concept.
Figure 3B:
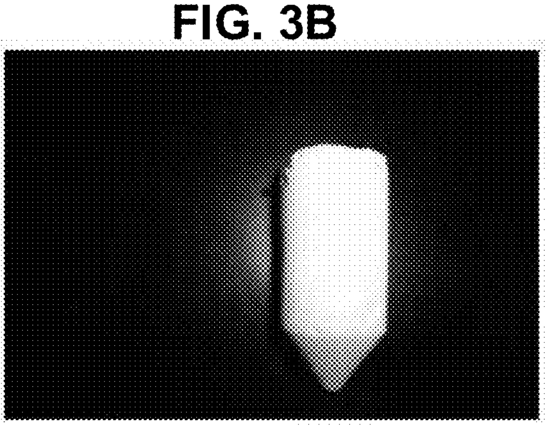
FIGS. 3B-3D are images of $SiO_2$@$TiO_2$ core-shell aerogels, according to one inventive concept.
Figure 3C:
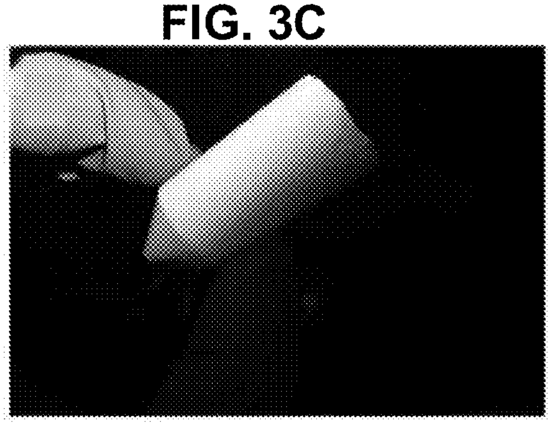
Figure 3D:
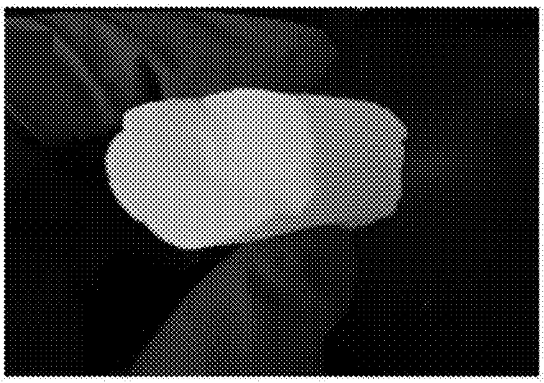

FIGS. 3A-3D are images of prepared $SiO_2$@$TiO_2$ core-shell wet gels and aerogels. Titania deposition on $SiO_2$ supports (wet gels or aerogel particles) was achieved by $TiCl_4$ non alkoxide sol-gel routes. $TiO_2$ formation was induced by heating at 80° C. (TIC route). FIG. 3A shows $SiO_2$@$TiO_2$ core-shell wet gels with an increasing concentration $TiCl_4$. Tube 1 is the $SiO_2$ control without $TiCl_4$, and progressively increasing concentrations $TiCl_4$ were added to tubes 2 through 6. As the concentration of $TiCl_4$ increased, the translucence of the wet gel decreased and the wet gel become more opaque, indicating deposition of increasing titania content on the silica gel surface. FIGS. 3B-3D are images of monolithic forms of the $SiO_2$@$TiO_2$ core-shell aerogels were obtained after drying the wet gels in supercritical $CO_2$.

Figure 3E:
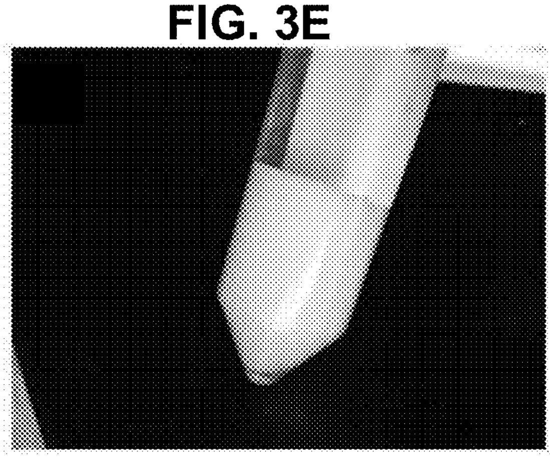
FIG. 3E is an image of a $SiO_2$—$TiO_2$ composite wet gel, according to one inventive concept.
Figure 3F:
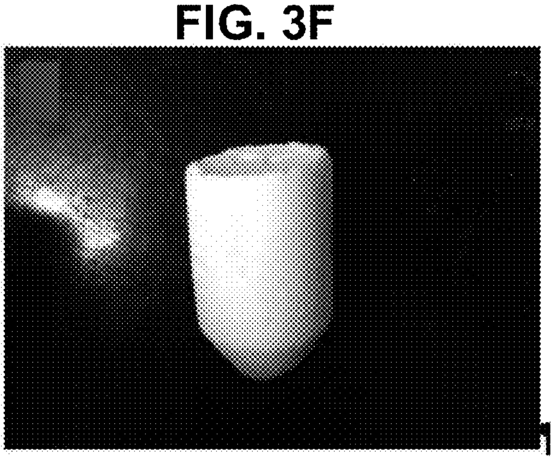
FIG. 3F is an image of a $SiO_2$—$TiO_2$ composite aerogel, according to one inventive concept.

FIG. 3E is an image of prepared $SiO_2$—$TiO_2$ composite wet gel formed by epoxide-assisted gelation (EAG route) using propylene oxide as proton scavenger. FIG. 3F is an image of a monolithic form of a $SiO_2$—$TiO_2$ composite aerogel obtained after drying the wet gel in supercritical $CO_2$.

$N_2$ Physisorption

Figure 4A:
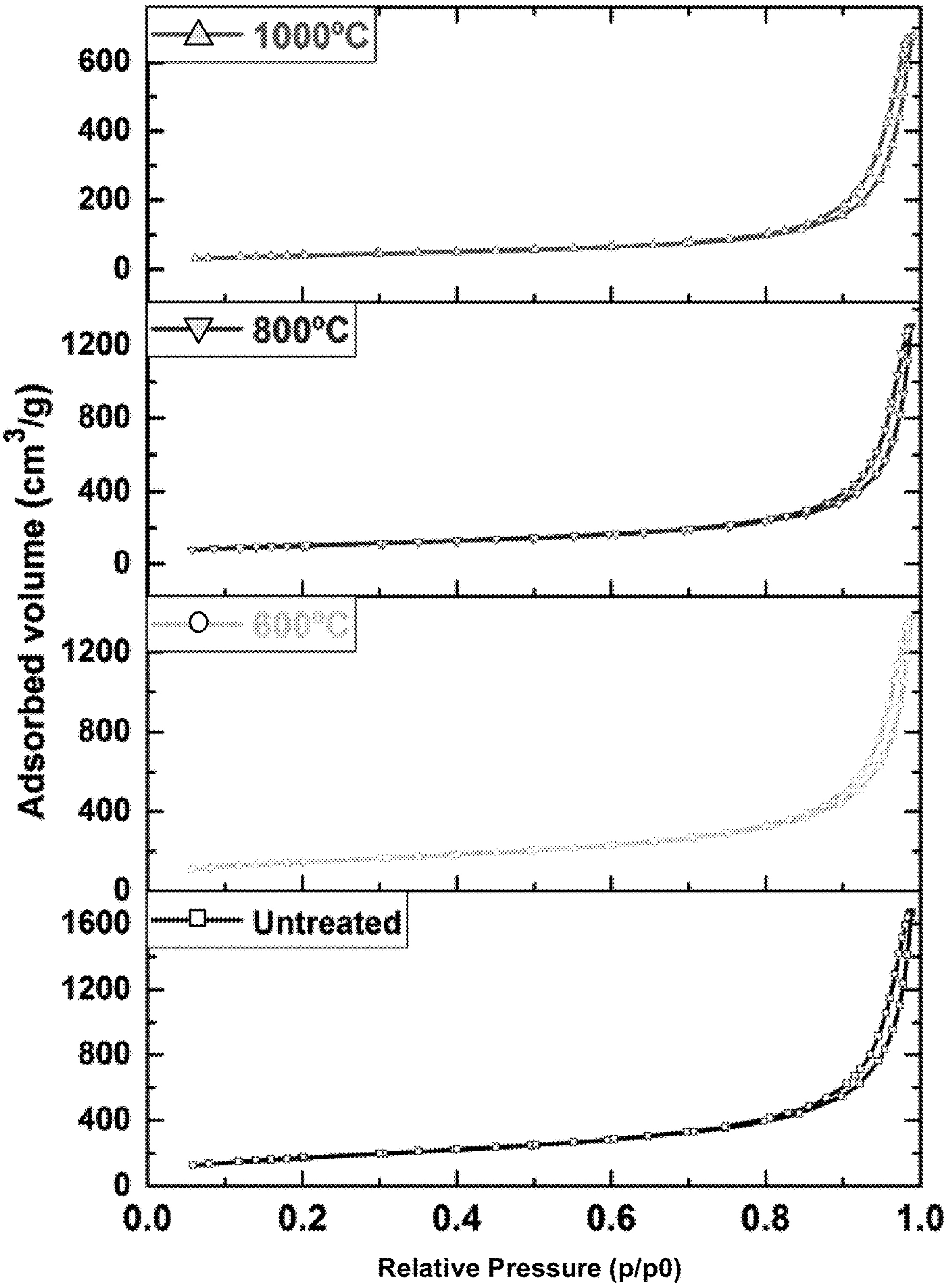
FIG. 4A is a plot of $N_2$ physisorption of $SiO_2$@$TiO_2$ core-shell aerogel (TID route) untreated, and annealed at 600° C., 800° C. and 1000° C., according to one inventive concept.
Figure 4B:
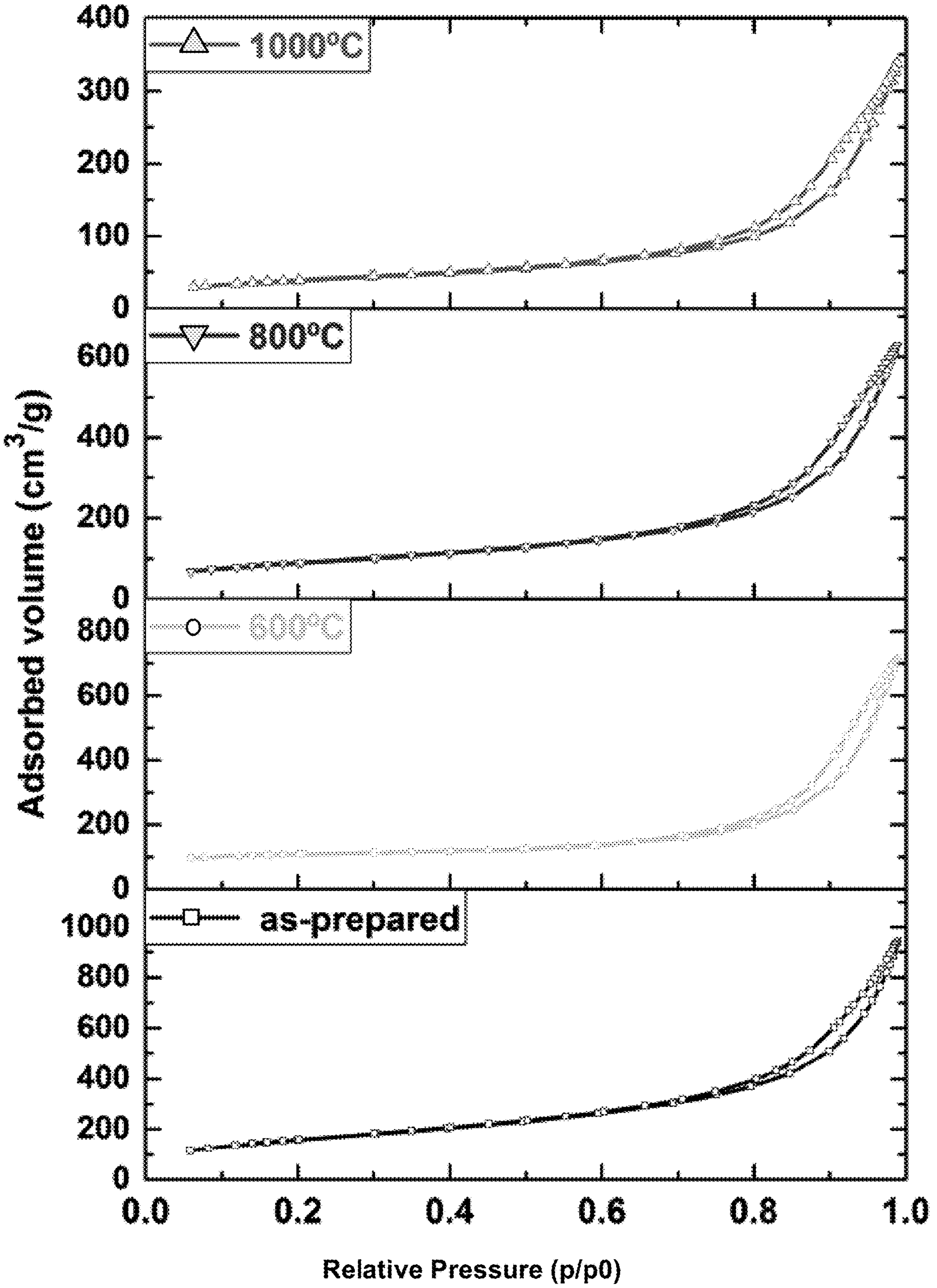
FIG. 4B is a plot of $N_2$ physisorption of $SiO_2$—$TiO_2$ composite aerogel (EAG route) as-prepared, and annealed 600° C., 800° C. and 1000° C., according to one inventive concept.

FIGS. 4A and 4B are plots of $N_2$ adsorption-desorption isotherms of $SiO_2$@$TiO_2$ core-shell aerogel samples (FIG.

4A) and $SiO_2$—$TiO_2$ composite aerogel samples (FIG. 4B). Controlled drying avoided shrinkage and pore collapse, thereby preserving the fine pore network structure in the dried material, and thus resulting in low density mesoporous solids with high porosity and large specific surface area, as evidence by $N_2$ physisorption measurements. FIG. 4A depicts $N_2$ adsorption-desorption isotherms plots for $SiO_2$@$TiO_2$ core-shell aerogel samples (TID route) as prepared and heat treated at different temperatures. FIG. 4B depicts $N_2$ adsorption-desorption isotherms plots for $SiO_2$—$TiO_2$ composite aerogel (EAG route) samples as prepared and heat treated at different temperatures.

FIGS. 5A-5C depict plots that compare loss of specific surface area (in absolute values (as shown in part (a)) and percentages (as shown in part (b)) with increasing thermal treatment temperature (600° C., 800° C. or 1000° C.). FIG. 5A depicts plots of loss of specific surface area of $SiO_2$@$TiO_2$ core-shell aerogels (TID) with increasing temperatures. FIG. 5B depicts plots of loss of specific surface area of $SiO_2$—$TiO_2$ composite aerogels (EAG) with increasing temperatures. FIG. 5C depicts plots of loss of specific surface area of $TiO_2$ aerogels with increasing temperatures.

$N_2$ adsorption-desorption isotherms of both $SiO_2$@$TiO_2$ core-shell aerogels (TID) and $SiO_2$—$TiO_2$ composite aerogels (EAG) may be classified as type IV isotherms, which are characteristic of mesoporous materials, thus confirming the porous nature of the prepared aerogel photocatalysts. Nevertheless, slight differences are observed between the two different silica-titania aerogels in regard to their isotherm hysteresis shapes. $SiO_2$@$TiO_2$ core-shell aerogels isotherms show H1 hysteresis loops, indicating the presence of uniform cylindrical mesopores, which is consistent for solids constituted by agglomerated spherical particles. On the other hand, $SiO_2$—$TiO_2$ composite aerogels isotherms depict hysteresis loops better classified as H3 type, characteristic of non-uniform slit-shaped pores. Either way, given their mesoporous structure, the as-prepared silica-titania aerogels show high specific surface area (around 600 $m^2/g$, as shown in Table 1), which is a desirable characteristic in high performance photocatalysts.

Analysis of the $N_2$ adsorption isotherms, derived textural properties values, and thermal stability are shown in Table 1. Without wishing to be bound by any theory, the observation of no significant changes in the isotherms shape as function of annealing temperature may suggest that the overall pore structure is maintained even after high temperature thermal treatments. Upon annealing, specific surface area of the silica-titania aerogels decreases as one would expect considering that thermal treatments lead to processes such as titania crystallization and pore coalescence. Nevertheless, the loss of surface area observed for the thermally-stable silica-titania aerogels may be relatively much smaller compared to that shown by bare $TiO_2$ aerogel (more than 99% after 800° C. treatment) as shown in FIG. 5C, further confirming the materials enhanced thermal stability.

TABLE 1

Textural properties of prepared aerogel materials

| Sample | Thermal Treatment | $S_{BET}$ ($m^2/g$) | Pore volume ($cm^3/g$) | Average Pore Diameter (nm) |
|---|---|---|---|---|
| $SiO_2/TiO_2$-EAG | As prepared | 577 | 1.32 | 9.1 |
| $SiO_2/TiO_2$-EAG | 600° C. | 374 | 1.02 | 10.9 |
| $SiO_2/TiO_2$-EAG | 800° C. | 319 | 0.9 | 11.2 |
| $SiO_2/TiO_2$-EAG | 1000° C. | 138 | 0.49 | 14.1 |
| $SiO_2$@$TiO_2$-TID | As prepared | 628 | 1.91 | 12.2 |
| $SiO_2$@$TiO_2$-TID | 600° C. | 526 | 1.63 | 12.4 |
| $SiO_2$@$TiO_2$-TID | 800° C. | 365 | 1.44 | 15.8 |
| $SiO_2$@$TiO_2$-TID | 1000° C. | 143 | 0.79 | 22.0 |
| $SiO_2$ | As prepared | 764 | 2.22 | 11.6 |
| $TiO_2$ | As prepared | 533 | 2.00 | 15.0 |
| $TiO_2$ | 600° C. | 69 | 0.32 | 18.8 |
| $TiO_2$ | 800° C. | 2.8 | 0.02 | 33.7 |
| $TiO_2$ | 1000° C. | 0.2 | — | — |

X-Ray Diffraction Analysis

Figures 6A, 6B, 6C, 6D:
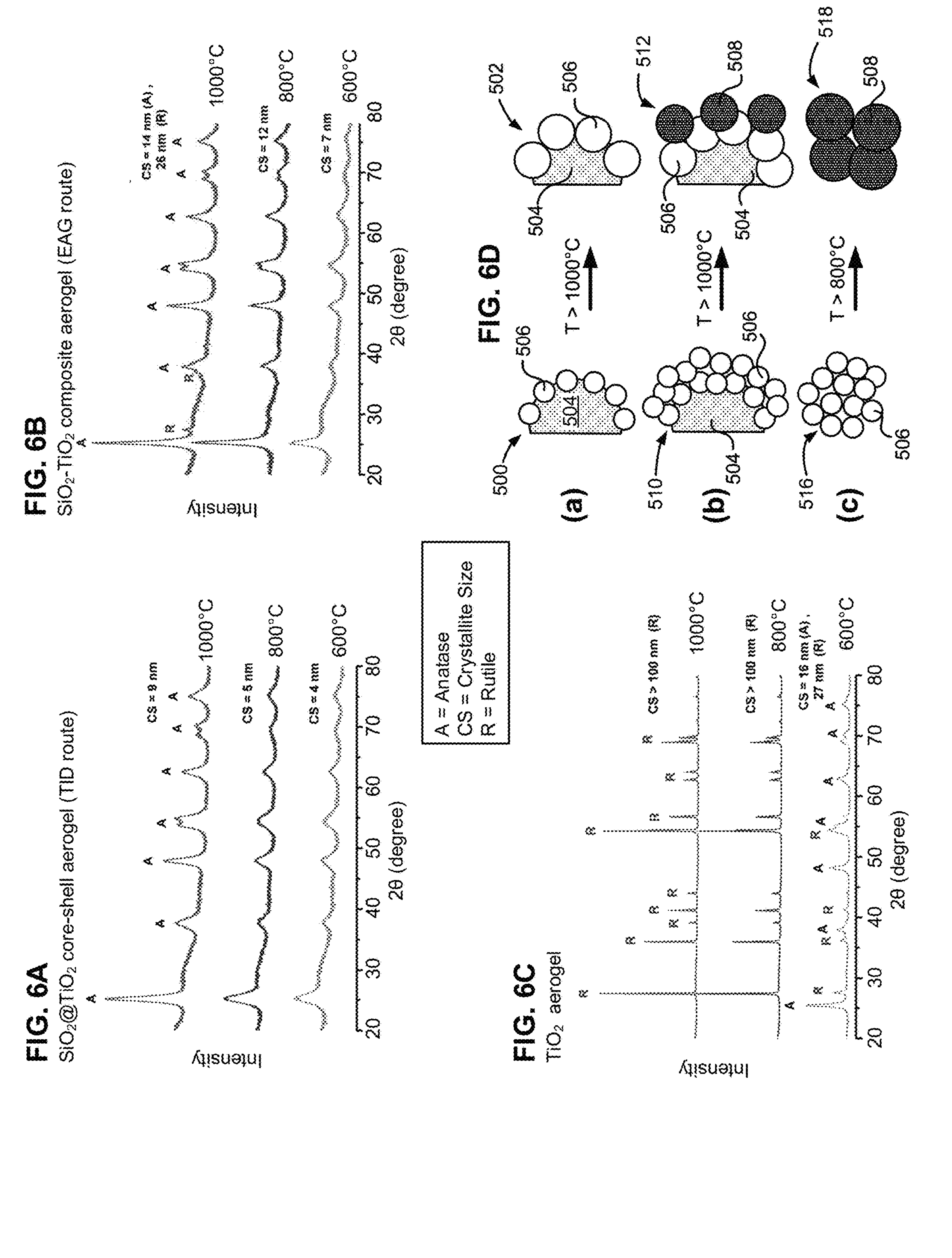
FIG. 6A is a plot of powder X-ray diffractograms of $SiO_2$@$TiO_2$ core-shell aerogels (TID route) annealed at 600° C., 800° C., and 1000° C., according to one inventive concept.
FIG. 6B is a plot of powder X-ray diffractograms of $SiO_2$—$TiO_2$ composite aerogels (EAG route) annealed at 600° C., 800° C., and 1000° C., according to one inventive concept.
FIG. 6C is a plot of powder X-ray diffractograms of $TiO_2$ aerogels annealed at 600° C., 800° C., and 1000° C., according to one inventive concept.
FIG. 6D part (a) is a schematic drawing of the crystallite growth of $SiO_2$@$TiO_2$ core-shell aerogel (TID route) after heat treatment, according to one inventive concept.

FIGS. 6A-6C show powder X-ray diffractograms analysis of $TiO_2$ aerogel and $SiO_2/TiO_2$ aerogels annealed at 600° C., 800° C., and 1000° C. Estimated crystallite sizes (where “CS” denotes “crystallite size”) are provide for anatase (A) and rutile (R) phases in each analyzed sample.

FIG. 6A shows exclusive formation of anatase (A) nanocrystallites in the heat-treated $SiO_2$@$TiO_2$ core-shell aerogels, which demonstrate exceptionally high thermal stability as crystalline size did not increase past 10 nm even after the materials were submitted to 1000° C. thermal treatment.

On the other hand, in FIG. 6C, at high temperatures, as shown for 1000° C., an unsupported $TiO_2$ aerogel sample undergoes crystallite growth (>100 nm) and extensive rutile (R) formation, including total conversion of anatase phase into rutile phase.

$SiO_2$—$TiO_2$ composite aerogels formed by the EAG route (FIG. 6B) shows predominately anatase (A) nanocrystallites with slightly higher anatase crystallite growth (from 7 nm to 14 nm) and small formation of rutile phase was observed for $SiO_2$—$TiO_2$ composite aerogels (EAG) annealed at 1000° C. compared to $SiO_2$@$TiO_2$ core-shell aerogels (TID). The anatase $TiO_2$ nanocrystals supported on silica aerogel (FIGS. 6A and 6B) present remarkable thermal stability, remaining stable and not being converted into rutile even after calcination at 1000° C. Thus, as shown in FIGS. 6A and 6B, at higher temperatures, as shown for 1000° C., the $SiO_2/TiO_2$ aerogels have nanocrystallites of the anatase phase of $TiO_2$ of a size less than 15 nm.

FIG. 6D is an illustrative drawing of structural behavior of the aerogels following thermal treatment. Part (a) of FIG. 6D illustrates the change in structure of a $SiO_2$@$TiO_2$ core-shell aerogels 502 formed by TID route following heat treatment. As shown prior to heat treatment, the structure of the $SiO_2$@$TiO_2$ core-shell aerogel 500 may include a $SiO_2$ wet gel 504 with anatase phase $TiO_2$ 506 (A-$TiO_2$) surrounding the $SiO_2$ wet gel 504. Heat treatment at temperatures greater than 1000° C. may cause a change of crystalline growth of the anatase phase $TiO_2$ 506 (A-$TiO_2$) to a stable anatase phase in the $SiO_2$@$TiO_2$ core-shell aerogel 502. Moreover, $SiO_2$@$TiO_2$ core-shell aerogel 502 may comprise pure anatase phase $TiO_2$ 506 (A-$TiO_2$).

Part (b) of FIG. 6D illustrates the change in structure of a $SiO_2$—$TiO_2$ composite aerogel 512 formed by EAG route following heat treatment. As shown prior to heat treatment, the structure of the $SiO_2$—$TiO_2$ aerogel 510 may include particles of $SiO_2$ wet gel 504 surrounded with $TiO_2$ 506 (A-$TiO_2$). Heat treatment at temperatures greater than 1000° C. causes a change of crystalline growth of the anatase $TiO_2$ 506 (A-$TiO_2$) to a mixture of anatase phase $TiO_2$ 506 (A-$TiO_2$) and rutile phase $TiO_2$ 508 (R—$TiO_2$) in the $SiO_2$—$TiO_2$ composite aerogels 512. Thus, the $SiO_2$—$TiO_2$ composite aerogels 512 may demonstrate a partial anatase phase to rutile phase conversion of the $TiO_2$.

Part (c) of FIG. 6D illustrates the change in structure of a $TiO_2$ aerogels 518 following heat treatment. As shown prior to heat treatment, the structure of the $TiO_2$ aerogel 516 may include anatase $TiO_2$ 506 (A-$TiO_2$). Heat treatment at temperatures greater than 800° C. may cause a change of greater crystalline growth of the anatase $TiO_2$ 506 (A-$TiO_2$) to a rutile phase $TiO_2$ 508 (R—$TiO_2$) in the $TiO_2$ aerogels 518. Moreover, the $TiO_2$ aerogels 518 may demonstrate a full (e.g., complete) anatase phase to rutile phase conversion of the $TiO_2$. Thus, the $TiO_2$ aerogel 518 may comprise pure rutile phase $TiO_2$ 508 (R—$TiO_2$).

Enhanced thermal stability of anatase nanocrystals in prepared silica-titania aerogels can be assigned to the role of silica as an effective thermal stable support. In the case of the $SiO_2$@$TiO_2$ core-shell aerogel (TID), the silica aerogel backbone act as an immobilizing support for $TiO_2$ nanocrystals, avoiding its crystallite growth and rutile formation, while in the $SiO_2$—$TiO_2$ composite aerogel (EAG) silica particles are dispersed in titania network, thus probably minimizing sintering and phase transformation by acting as steric barriers to the diffusion of $TiO_2$ nanoparticles.

Photocatalysis

Figure 7A:
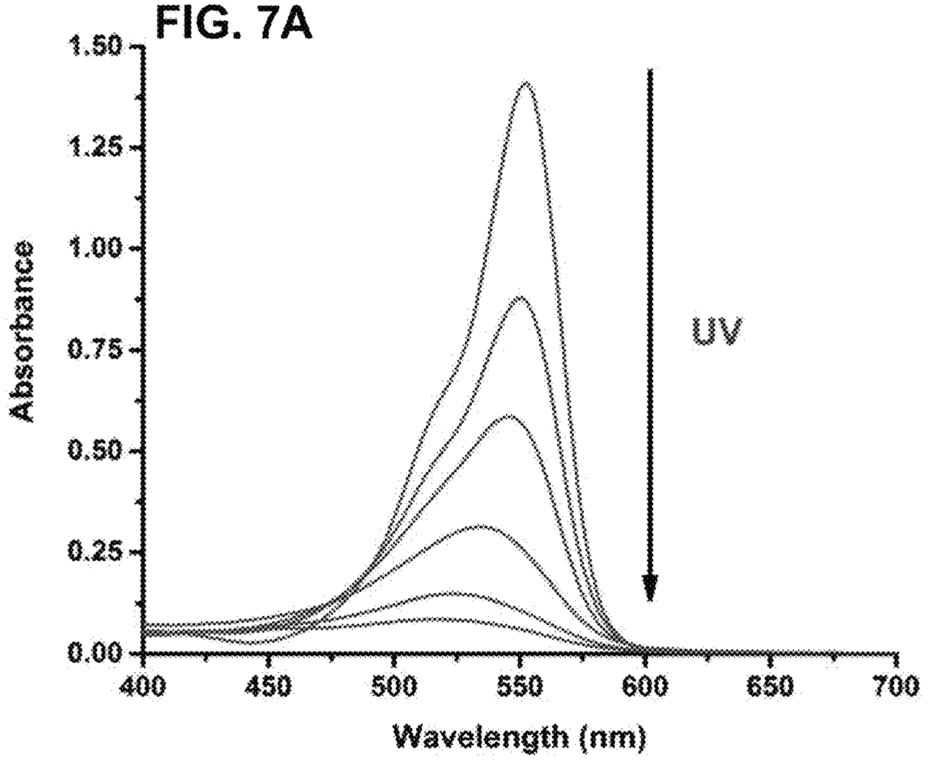
FIG. 7A is a plot of Rhodamine B dye photodegradation promoted by $SiO_2$@$TiO_2$ aerogel particles monitored by absorbance change in the dye electronic spectra in visible region as function of irradiation time.
Figure 7B:
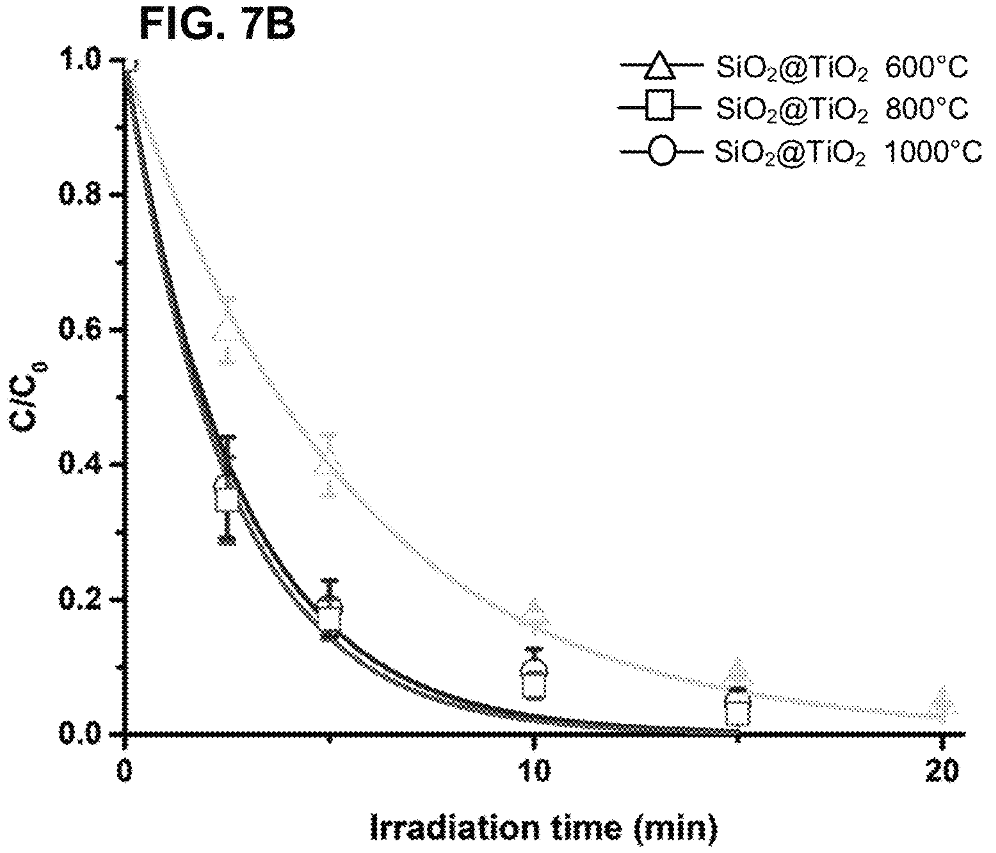
FIG. 7B is a plot of photocatalytic degradation of Rhodamine B dye in the presence of $SiO_2$@$TiO_2$ aerogel particles, according to one inventive concept.
Figure 7C:
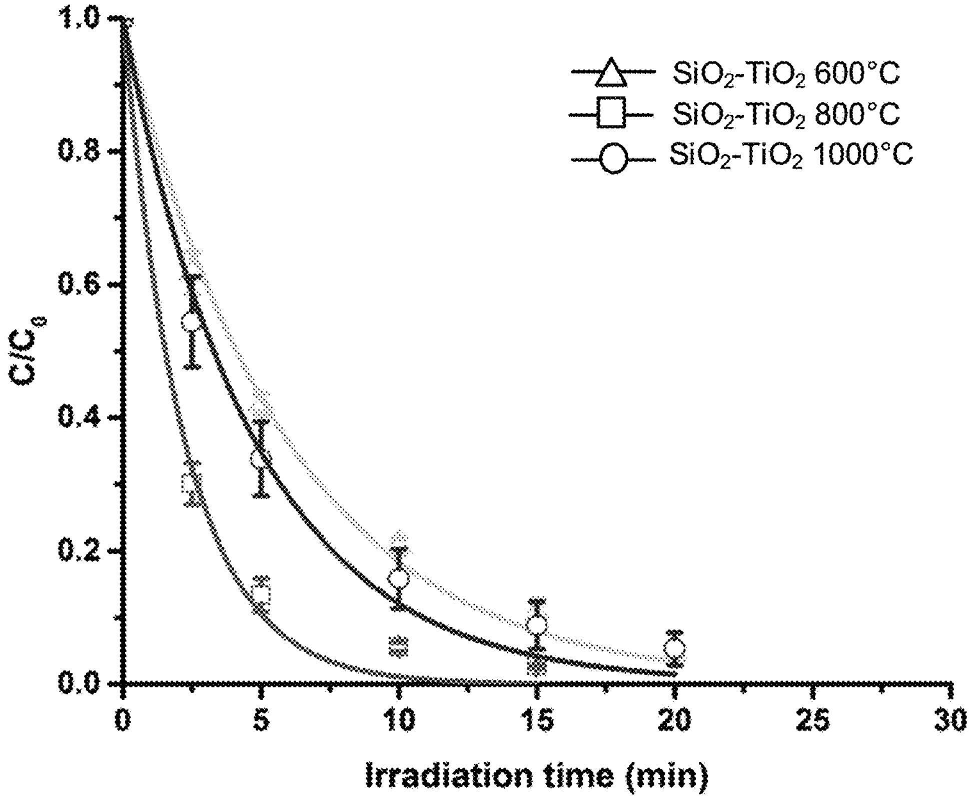
FIG. 7C is a plot of photocatalytic degradation of Rhodamine B dye in the presence of $SiO_2$—$TiO_2$ composite aerogel particles, according to one inventive concept.
Figure 7D:
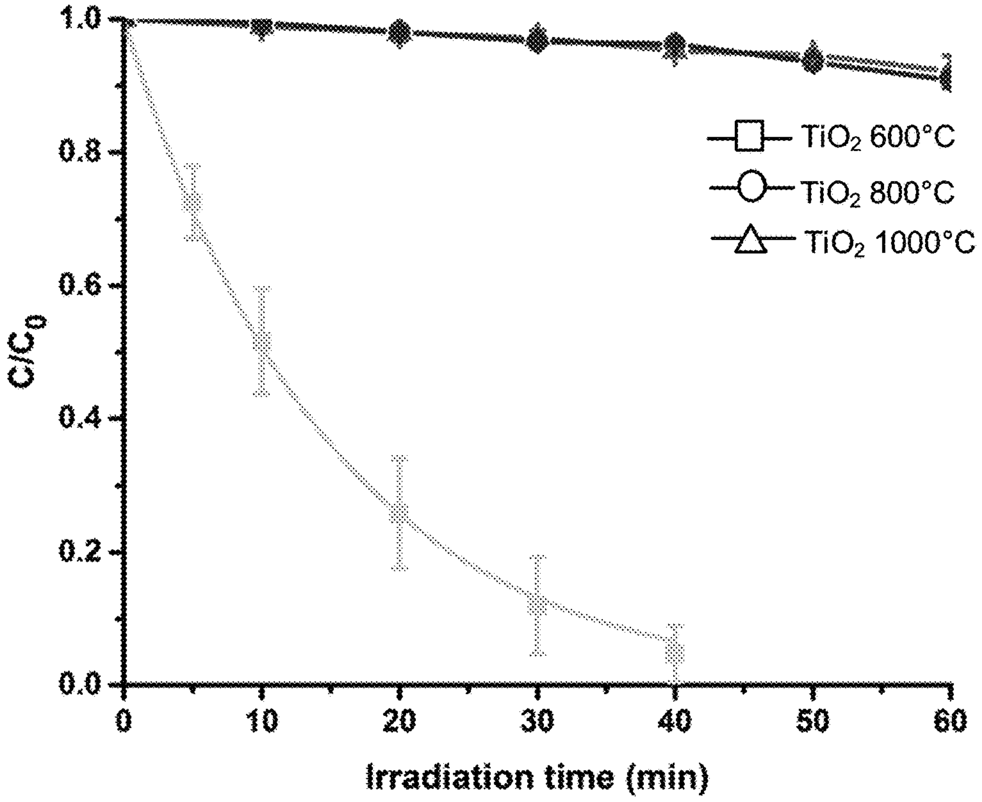
FIG. 7D is a plot of photocatalytic degradation of Rhodamine B dye in the presence of $TiO_2$ aerogel particles, according to one inventive concept.
Figure 7E:
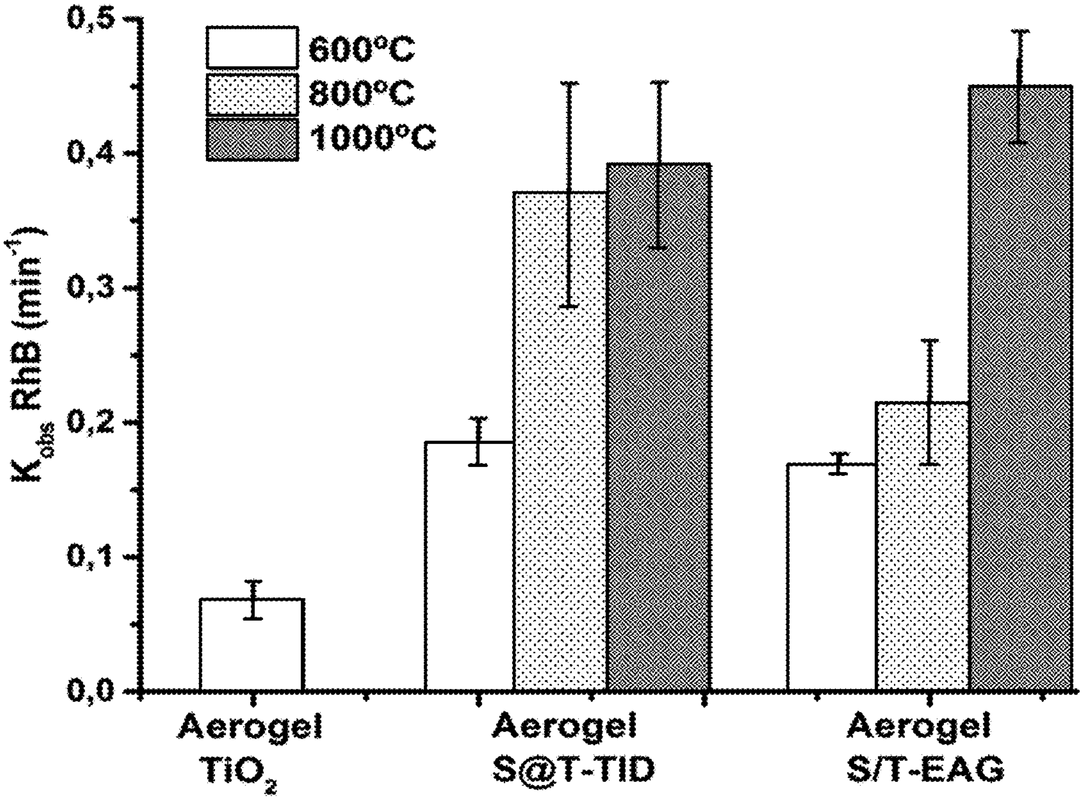
FIG. 7E is a bar graph depicting thermal treatment temperature effect on RhB photodegradation first-order kinetic constants ($K_{obs}$) for a $SiO_2$—$TiO_2$ composite aerogel, a $SiO_2$@$TiO_2$ core-shell aerogel, and a bare $TiO_2$ aerogels.

FIGS. 7B-7D show photocatalytic degradation of Rhodamine B (RhB) dye in the presence of $SiO_2$@$TiO_2$ core-shell aerogels particles (TID route, FIG. 7B) and $SiO_2$—$TiO_2$ composite aerogels particles (EAG route, FIG. 7C) $TiO_2$ aerogel (FIG. 7D) monitored by the decrease RhB concentration as a function of UV irradiation (FIG. 7A). FIG. 7E compares the RhB photodegradation first-order kinetics constants of aerogels of $SiO_2$@$TiO_2$, $SiO_2$—$TiO_2$ and bare $TiO_2$. Both the prepared $SiO_2$@$TiO_2$ core-shell and $SiO_2$—$TiO_2$ aerogels (FIGS. 7B and 7C) showed remarkably higher photocatalytic activity as compared to unsupported $TiO_2$ aerogels (FIG. 7D) as demonstrated by Rhodamine B photodegradation assays.

Improvement of the photocatalytic activity of $SiO_2/TiO_2$ aerogels was observed upon calcination at 800-1000° C. as shown in FIG. 7E. Without wishing to be bound by any theory, the increase in crystallinity may improve the photocatalytic activity of the aerogels. As shown in FIG. 7D, a drastic decrease in photoactivity was observed for calcined unsupported titania. Without wishing to be bound by any theory, it is believed the loss of photoactivity of the unsupported titania may be caused by complete conversion of anatase into rutile and significant loss of specific surface area.

Highest photocatalytic activity for RhB photodegradation was achieved for $SiO_2$—$TiO_2$ composite aerogels with $TiO_2$ content in the range of 55-75% and calcined at 1000° C. and for $SiO_2$@$TiO_2$ core shell aerogels with $TiO_2$ content in the range of 55-65% and calcined at 1000° C. Further evaluation of the materials photocatalytic activity was carried out by Crystal Violet (CV) dye photodegradation.

Figure 8:
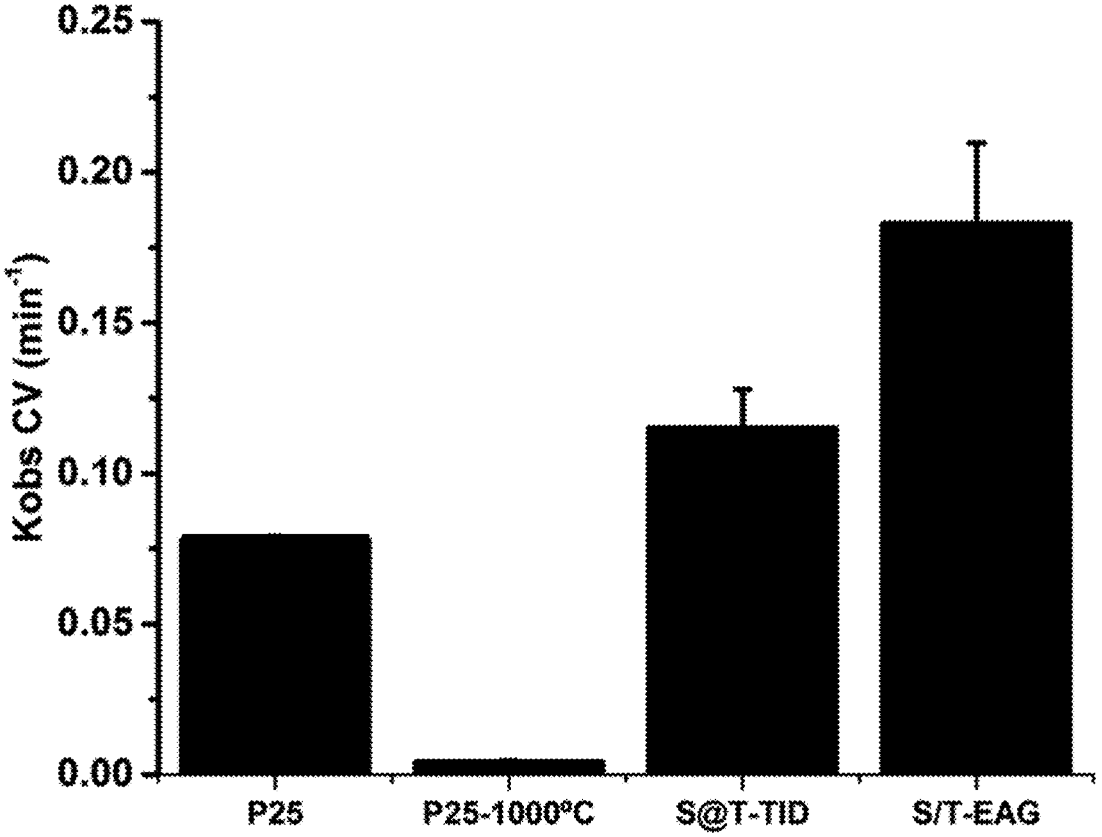
FIG. 8 is a bar graph depicting a comparison of photocatalytic activity in terms of Crystal Violet dye photodegradation first-order kinetic constants (Kobs) for $SiO_2$—$TiO_2$ composite aerogels and $SiO_2$@$TiO_2$ core-shell aerogel treated at 1000° C. and high performance commercial photocatalyst P25 (non-treated and treated at 1000° C.), according to one inventive concept.

FIG. 8 depicts a comparison of photocatalytic activity in terms of CV photodegradation first order kinetic constants for the most active $SiO_2$@$TiO_2$ core-shell aerogels and $SiO_2$—$TiO_2$ composite aerogels calcined at 1000° C. with those of high performance commercial photocatalyst Degussa P25 before and after 1000° C. thermal treatment. Both the calcined silica-titania aerogel show higher photocatalytic activity compared to P25 and vastly outperforms the calcined P25 samples. Without wishing to be bound by any theory, it is believed that superior photocatalytic performance of $SiO_2$@$TiO_2$ core-shell aerogels and $SiO_2$—$TiO_2$ composite aerogels may be assigned to the high photoactivity of silica supported anatase nanocrystals as well as improved Rhodamine B adsorption capacity by $SiO_2$ aerogel support.

Experimental Results

The following section describes experimental procedures and results according to exemplary aspects of the present invention. The following experimental procedures and results are presented by way of example only, and should not be deemed limiting on any of the embodiments and approaches described herein.

Reagents

Titanium (IV) tetrachloride ($TiCl_4$, 99%), tetraethylortosilicate (TEOS, 98%), propylene oxide (PO, 99%), Ammonium hydroxide ($NH_4OH$, 28%), N,N-dimethylformamide (DMF, anhydrous), Ethanol (Anhydrous) and Rhodamine B (RhB, 99%) were purchased from Sigma-Aldrich (USA). Crystal violet (1% solution) was purchased from QHEMIS (Brazil). All reagents were used without further purification.

Preparation of aerogel photocatalysts was carried out by using sol-gel chemistry to obtain monolithic wet gels followed by controlled drying employing supercritical $CO_2$. We employed two novel $TiCl_4$-based routes to prepare the silica-titania wet gels using silica wet gels scaffolds and silica aerogel powder particles as support and reinforcing agent to obtain $SiO_2$@$TiO_2$ core-shell gels and $SiO_2$—$TiO_2$ composite gels, respectively. The detailed procedures for the synthesis of aerogels are described below and a list of the prepared silica-titania aerogel samples with respective amounts of precursors employed and $TiO_2$ content determined by x-ray fluorescence (XRF) analysis are summarized in Table 2.

$SiO_2$ wet gels and aerogel particles: $SiO_2$ wet gels were prepared by the two-step acid/base catalyzed hydrolysis polycondensation of tetraethylorthosilicate (TEOS). In a typical synthesis, 10 mmol of TEOS was initially dissolved in 9 mL of ethanol in a polypropylene centrifuge tube, followed by the addition of deionized $H_2O$ (40 mmol) and concentrated HCl (20 μL). After homogenization by shaking, the reaction solution was kept undisturbed and allowed to react for 1 h. A mixture of 9 mL N,N Dimethylformamide (DMF):5 mL ethanol:124 μl

TABLE 2

Summary of the prepared silica-titania aerogels with respective amounts of precursors, synthesis method employed, and experimeintal $TiO_2$ content (mass percentage determined by XRF anaylsis)

| Sample Method | Synthesis | % $TiO_2$ | $TiCl_4$ | $SiO_2$ (XRF) |
|---|---|---|---|---|
| 1 | TID | 2.5 mmol | Wet $SiO_2$ gel (10 mmol TEOS) | 23% |
| 2 | TID | 5 mmol | Wet $SiO_2$ gel (10 mmol TEOS) | 39% |
| 3 | TID | 10 mmol | Wet $SiO_2$ gel (10 mmol TEOS) | 53% |
| 4 | TID | 15 mmol | Wet $SiO_2$ gel (10 mmol TEOS) | 63% |
| 5 | TID | 20 mmol | Wet $SiO_2$ gel (10 mmol TEOS) | 65% |
| 6 | EAG | 10 mmol | 100 mg $SiO_2$ aerogel powder | 93% |
| 7 | EAG | 10 mmol | 200 mg $SiO_2$ aerogel powder | 83% |
| 8 | EAG | 10 mmol | 500 mg $SiO_2$ aerogel powder | 73% |
| 9 | EAG | 10 mmol | 800 mg $SiO_2$ aerogel powder | 60% |
| 10 | EAG | 10 mmol | 1000 mg $SiO_2$ aerogel powder | 54% |

$NH_4OH$ was subsequently added to promote gelation. The $SiO_2$ wet gels were then aged for 24 h at room temperature, washed several times with ethanol and acetone. The as-obtained $SiO_2$ wet gels were used as supports and coated by $TiO_2$ during preparation of $SiO_2$@$TiO_2$ gel (TID route). In order to obtain the material also in dried aerogel form, silica wet gels were dried by $CO_2$ supercritical drying (Pressure=1500 psi, Temperature=50° C.). The obtained $SiO_2$ aerogel monoliths were ground into a fine particulate powder for use in the synthesis of $SiO_2$—$TiO_2$ gels (EAG route).

$SiO_2$@$TiO_2$ core-shell aerogels by thereto-induced deposition (TID route): For the preparation of $SiO_2$@$TiO_2$ aerogels, $SiO_2$ wet gels were coated with $TiO_2$ by soaking the silica scaffold in $TiCl_4$/DMF precursor solutions and subsequently promoting thermohydrolysis, as illustrated in the TID scheme 230 of FIG. 2. Typically, $TiCl_4$ (2.5-20 mmol) was slowly added to 14 mL of DMF followed by the addition of deionized water, keeping the $TiCl_4$:$H_2O$ molar ratio equal to 6. After homogenization by shaking, a transparent slightly yellow $TiCl_4$-based precursor solution was obtained. The $SiO_2$ wet gels, previously washed and immersed in DMF, were soaked in this precursor solution for 24 h to ensure complete infiltration of the precursor solution into the gel pore structure. In order to promote deposition of $TiO_2$, the centrifuge tubes containing the soaked gels were kept at 80° C. for 24 h in an oven. The gels were then washed once with DMF and several times with ethanol and acetone before being converted into aerogels by $CO_2$ supercritical drying (Pressure=1500 psi, Temperature=50° C.). The obtained aerogel monoliths were ground into fine powders and heat-treated at different temperatures (T=600, 800, 1000° C.) for 2 h using a heating rate of 10° C./min.

$SiO_2$—$TiO_2$ composite aerogels by epoxide assisted gelation (EAG route): $SiO_2$—$TiO_2$ composite gels were prepared by epoxide assisted sol-gel synthesis employing $TiCl_4$ as a non-alkoxide precursor, propylene oxide as gelation agent and $SiO_2$ aerogel particles as silica source, as illustrated in FIG. 1. Briefly, $TiCl_4$ (10 mmol) was slowly added to 14 mL of DMF, followed by the addition of 60 mmol of deionized water. After homogenization by shaking, a transparent, slightly yellow stable $TiCl_4$-derived precursor solution was obtained. This precursor solution was added to a suspension of $SiO_2$ aerogel particles (100-1000 mg $SiO_2$/10 mL DMF) and the resultant mixture was kept under magnetic stirring for 24 hours. Finally, gelation was initiated by quick addition of a mixture consisting of 4 mL N,N-Dimethylformamide and 3.5 ml propylene oxide. Just before gelation (which occurs within 5 minutes), the mixture was divided into two equal parts and transferred to separate centrifuge tubes. A similar procedure was employed for the preparation of unsupported $TiO_2$ aerogels but without the addition of $SiO_2$ aerogel particles. The obtained $TiO_2$ and $SiO_2$/$TiO_2$ wet gels were aged for 24 h at room temperature, washed several times with ethanol and acetone and subsequently converted to respective aerogels by $CO_2$ supercritical drying (Pressure=1500 psi, Temperature=50° C.). The obtained aerogel monoliths were ground into fine powders and heat-treated at different temperatures (T=600, 800, 1000° C.) for 2 h using a heating rate of 10° C./min.

Materials Characterization

X-ray diffractograms were collected on an AXS D8 ADVANCE (Bruker, Germany) X-ray diffractometer equipped with a LynxEye 1-dimensional linear Si strip detector. The equipment was operated at 40 kV and 40 mA and employing Ni-filtered Cu Kα radiation. Diffraction patterns were collected from 10 to 80° 2θ with scan parameters of 0.02° steps and 2 s counting time per step. Scherrer equation was employed to estimate crystallite sizes based on broadening of the (101) anatase diffraction peak at around 25° after correction for instrumental broadening determined by measuring a bulk $Al_2O_3$ standard in the same conditions. Rutile mass fraction was estimated based on the intensity ratio of (100) and (101) diffraction peaks of anatase and rutile, respectively. Raman spectra were obtained using a Nicolet Almega Confocal Raman spectrometer (Thermo Fisher Scientific, USA) coupled to an Olympus microscope. Spectra were collected using a 632.8 nm HeNe laser operated at 13% intensity as the excitation source, accumulating 16 scans with 10 s collection time in the 100-3900 cm-1 range. X-ray fluorescence (XRF) analysis was performed using a benchmark MiniPal4 (PANalytical, Netherlands) energy-dispersive spectrometer equipped with a rhodium tube as X-ray source. All the measurements were acquired after a total measurement time of 840 s under He atmosphere and $TiO_2$ and $SiO_2$ contents were determined using the standardless analysis package Omnian (PANalytical, Netherlands). Nitrogen adsorption isotherms were measured at liquid nitrogen temperature (77 K) using an ASAP 2020 surface area analyzer (Micromeritics). Samples were previously treated at 150° C. under vacuum ($10^{-5}$ Torr) for at least 24 h to remove all adsorbed species. Textural properties were determined using Brunauer-Emmett-Teller (BET) method. Samples for scanning electron microscopy (SEM) analysis were prepared by deposition of powder samples over conductive carbon adhesive tapes supported on aluminum stubs. Low magnification SEM images were collected in secondary electron detection mode using a ZEISS LEO 440 (ZEISS UK) electron microscope equipped with tungsten filament gun operated at 15 kV and working distance of 10-11 mm, while higher magnification images were collected using a JSM-7401-F (JEOL, Japan) field emission gun electron microscope operated at 2 kV with a working distance of 2-8 mm. High resolution transmission electron microscopy (HRTEM) characterization was performed on a JEOL TEM 2010 electron microscope operated at 80 kV. The aerogels were broken up by placing them between two glass slides with a drop of water and rubbing a lacey carbon TEM grid over the dispersed aerogel for analysis.

Photocatalytic Activity Test

Evaluation of aerogel materials photocatalytic activity was carried out by Rhodamine B (RhB) photodegradation assays. Firstly, 14 mg of photocatalyst powder were dispersed in 35 mL of deionized water by sonication for 30 min. The suspension was then transferred to a cylindrical borosilicate photoreactor containing 35 mL of RhB solution (20 mg $L^{-1}$). The system was kept under magnetic stirring for 2 h in the dark prior to UV exposure. Illumination of the photoreactor was carried out using an OmniCure S2000 (Excelitas Technologies, USA) high pressure 200 W Hg lamp equipped with a light guide placed at distance of 7 cm from the photoreactor. A second set of photocatalytic tests were carried out for comparison of selected aerogel photocatalysts with standard $TiO_2$ photocatalyst Degussa-Evonik P25 (un-calcined and calcined at 1000° C. for 1 h). In this case, experiments were carried out in identical conditions, but using a Lightningcure LC8 (Hamamatsu, Japan) 200 W Hg—Xe arc lamp and using either RhB or Crystal Violet (CV) as dye solutions (20 mg $L^{-1}$).

In order to monitor the dye photodegradation, 1 mL aliquots were collected at different irradiation intervals and centrifuged. Electronic spectra of the supernatants were taken and the RhB concentration was estimated by measuring the absorbance at 553 nm (RhB) or at 582 nm (CV).

Chemical Composition (XRF Analysis)

Figure 9:
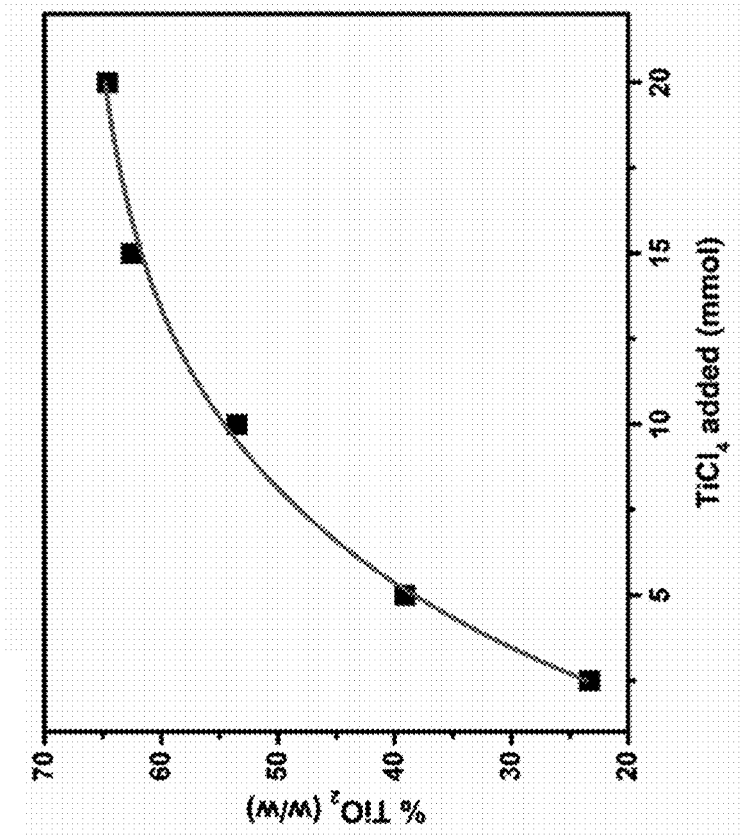
FIG. 9 is a chart depicting the effect of variation of $TiO_2$ content in silica-titania aerogels (mass percentage determined by XRF analysis) as a function of $TiCl_4$ precursor (TID aerogels).
Figure 10:
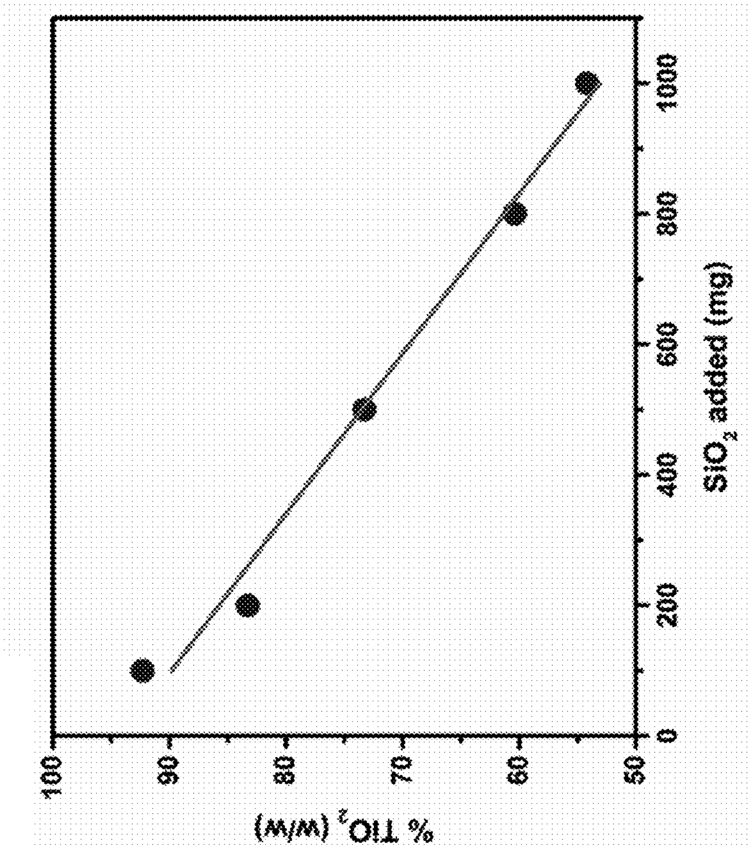
FIG. 10 is a chart depicting the effect of variation of $TiO_2$ content in silica-titania aerogels (mass percentage determined by XRF analysis) as a function of $SiO_2$ aerogel particles (EAG aerogels).

The chemical composition ($SiO_2$ and $TiO_2$ contents) of the aerogels is controllable by varying the amount of $TiCl_4$ precursor (2.5-20 mmol) employed in the TID synthesis of $SiO_2$@$TiO_2$ aerogels and by changing the mass of $SiO_2$ particles added (100-1000 mg) in the $SiO_2$—$TiO_2$ aerogels prepared by EAG method. In order to evaluate the impact of these synthetic parameters over the chemical composition, $TiO_2$ loading of aerogels samples was determined by X-ray fluorescence analysis and plotted as function of the varied parameters, as shown in FIG. 9 (for $SiO_2$@$TiO_2$ TID aerogels) and FIG. 10 (for $SiO_2$—$TiO_2$ EAG aerogels). $TiO_2$ content of TID aerogels was determined to vary in the range of 23%-65%, showing that remarkably high amounts of titania can deposited on the porous silica supports using TID synthetic method. A first order exponential correlation is found for the $TiO_2$ loading variation as function of $TiCl_4$ precursor (FIG. 9) amount for TID aerogels, suggesting that titania content reaches a plateau near 65%, possibly due to saturation of available silica surface. On the other hand, a negative linear correlation (FIG. 10) is found for $TiO_2$ loading (54-92% range) variation as function of $SiO_2$ added in the EAG sol-gel mixture, indicating efficient entrapment of silica aerogel particles in the titania gel network. To effectively compare the silica-titania aerogel photocatalysts obtained by the EAG and TID methods, samples $SiO_2$@$TiO_2$-TID-10 (prepared with 10 mmol $TiCl_4$) and $SiO_2$—$TiO_2$-EAG-1000 (prepared with 1000 mg $SiO_2$) were used in most characterization studies, because they had similar $TiO_2$ loading values (53.5 and 54%, respectively).

Crystalline Phase Analysis and Thermal Stability (XRD)

A powder X-ray diffraction technique was used to study the crystallization and thermal stability of silica-titania and unsupported titania aerogels after they are submitted to high-temperature thermal treatments. FIGS. 6A-6C, which are discussed in detail above, show diffractograms of $SiO_2$@$TiO_2$-TID, $SiO_2$—$TiO_2$-EAG and $TiO_2$ aerogels annealed at 600° C., 800° C. and 1000° C., as well as the respective estimated crystallite sizes (CS).

Figure 11A:
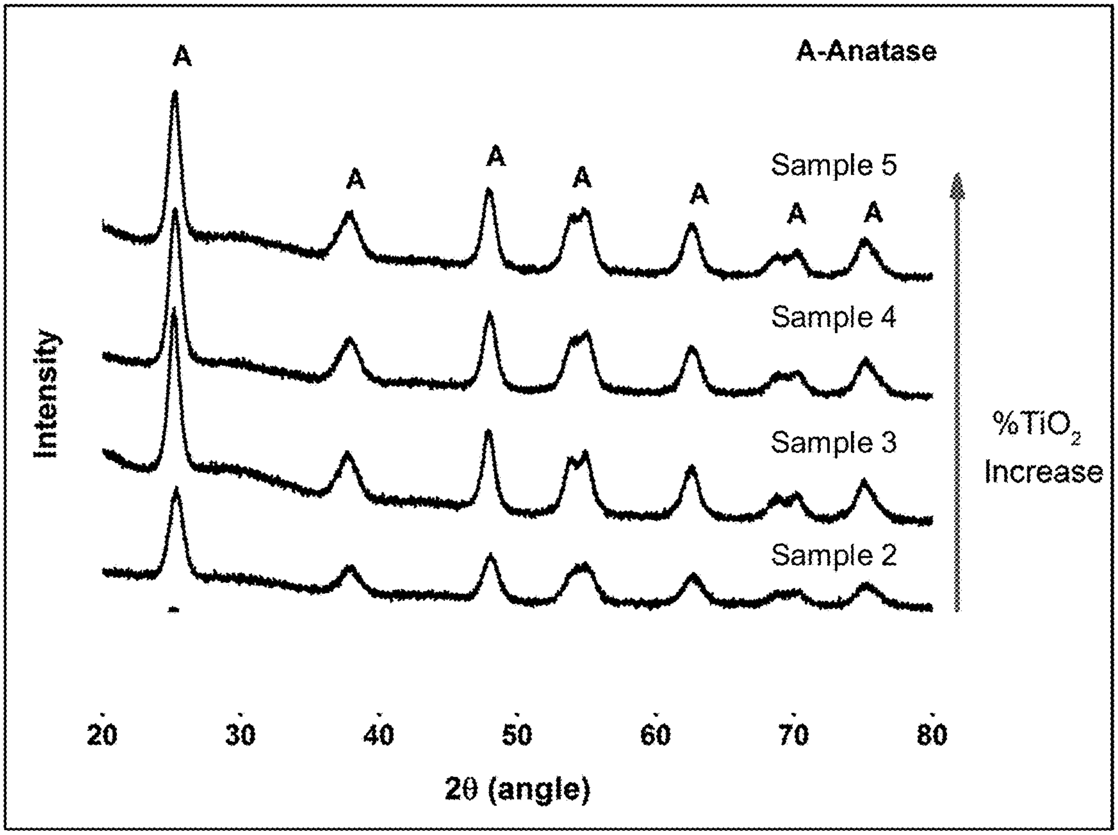
FIGS. 11A-11B are Powder X-ray diffractograms of $SiO_2$@$TiO_2$-TID and $SiO_2$/$TiO_2$-EAG aerogel samples, respectively, with increasing $TiO_2$ content and after annealing at 1000° C.
Figure 11B:
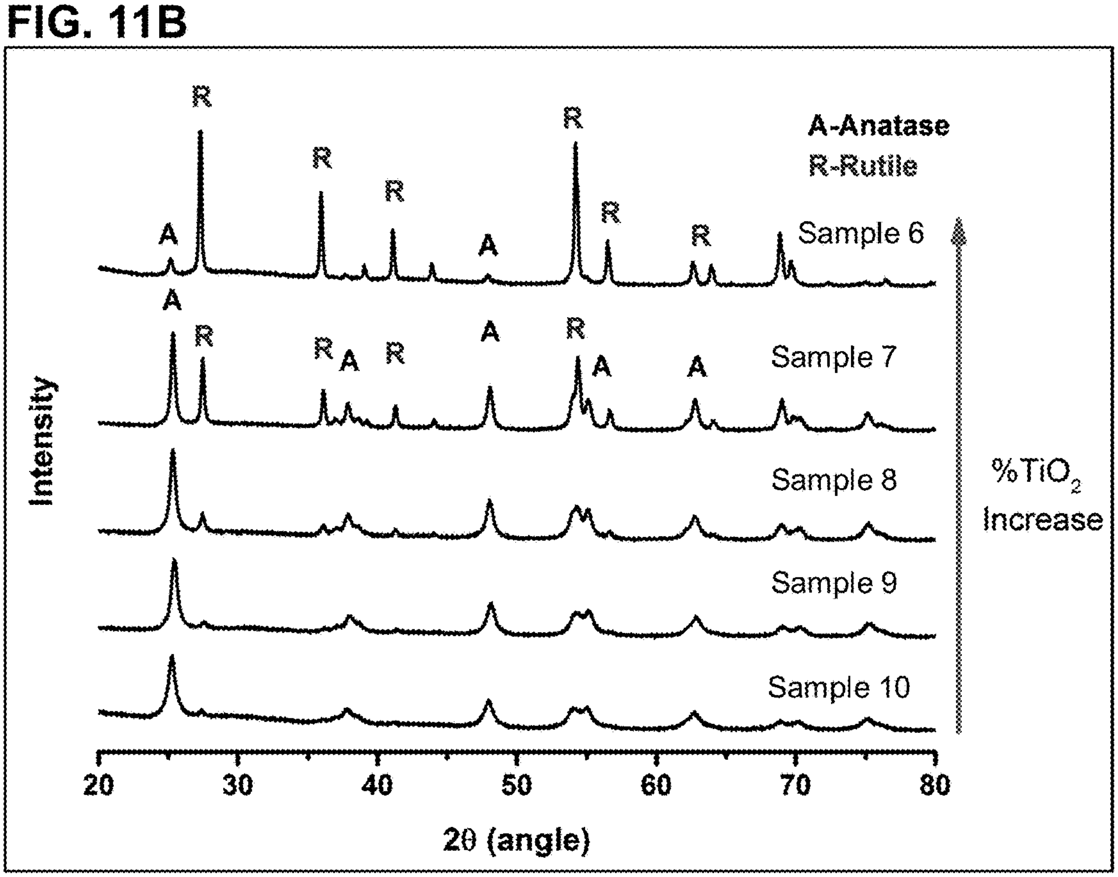

FIGS. 11A-11B compare diffractograms of TID and EAG silica-titania aerogels with different $TiO_2$ content after annealing at 1000° C. The samples in FIG. 11A correspond to Samples 1-5 of Table 2, while the samples of FIG. 11B correspond to Samples 6-10 of Table 2.

XRD analysis revealed very distinguished structural behavior and thermal stability for silica-titania aerogels samples as compared to the unsupported titania aerogel. As expected, $TiO_2$ aerogel undergoes partial anatase-to-rutile transformation at 600° C. (~30% rutile), while upon higher temperature annealing (T>800° C.) complete conversion into rutile (100% rutile) and extensive uncontrolled crystallite growth (>100 nm) are observed. On the other hand, almost exclusive formation of anatase phase nanocrystallites was observed in the heat-treated silica-titania aerogels (FIGS. 6A-6B) even when annealed at 1000° C., thus demonstrating the superior thermal stability of nanocomposite aerogels compared to bare $TiO_2$ aerogel.

Porosity and Surface Area ($N_2$ Physisorption)

Nitrogen porosimetry analysis was carried out to determine the textural properties and study the pore structure of the as prepared and annealed silica-titania aerogel samples. The $N_2$ adsorption-desorption isotherms of $SiO_2$@$TiO_2$-TID and $SiO_2$—$TiO_2$ EAG heat-treated at different temperatures are shown in FIGS. 4A-4B, while textural properties values determined using BET method are summarized on Table 1, above.

The $N_2$ adsorption-desorption isotherms of both $SiO_2$@$TiO_2$-TID and $SiO_2$—$TiO_2$ EAG aerogels (FIGS. 4A-B) can be classified as type IV isotherms, which are characteristic of mesoporous materials, thus confirming the porous nature of the prepared aerogel photocatalysts. Nevertheless, slight differences are observed between the two different silica-titania aerogels in regard to their isotherm hysteresis shapes. $SiO_2$@$TiO_2$-TID aerogels isotherms show H1 hysteresis loops, indicating the presence of uniform cylindrical mesopores, which is consistent for solids constituted by agglomerated spherical particles. On the other hand, $SiO_2$—$TiO_2$ EAG aerogels isotherms depict hysteresis loops better classified as H3 type, characteristic of non-uniform slit-shaped pores. Either way, given their mesoporous structure, the as-prepared silica-titania aerogels show high specific surface area (around 600 $m^2/g$, as shown in Table 1, above), which is a desirable characteristic in high performance photocatalysts.

Analysis of the $N_2$ adsorption-desorption isotherms and derived textural properties values (Table 2) also provide further insights on the thermal stability of the aerogels. No significant changes in the isotherms shape is observed as function of annealing temperature, suggesting that the overall pore structure is maintained even after high temperature thermal treatments. Upon annealing, specific surface area of the silica-titania aerogels decreases, which is expected considering that thermal treatments lead to processes such as titania crystallization (as shown by XRD analysis) and pore coalescence. Nevertheless, in terms of both absolute and percentage values the loss of surface area observed for the thermally-stable silica-titania aerogels is much lower than that of bare $TiO_2$ aerogel, as shown in FIG. 5C, which is discussed in more detail above. These results further confirm the materials' outstanding high thermal stability. Finally, thermal treatments also resulted in decreased pore volume and corresponding increases in average pore diameter, which is probably related to the coalescence of small pores into larger ones.

Photocatalysis

The results of testing the various samples is presented above in the section entitled "Photocatalysis." See also FIGS. 7A-8, depicting results of evaluation of the experimental samples.

In general, the highest photocatalytic activity was achieved by $SiO_2$—$TiO_2$ composite aerogel prepared by EAG route, a photocatalyst that combines high surface area, interconnected mesoporous structure and mixed anatase/rutile (~80% anatase/20% rutile) nanocrystalline titania phases. Without wishing to be bound by any theory, it is believed that the higher photocatalytic performance of EAG aerogel compared to TID aerogel can be assigned to enhanced charge separation due to bicrystalline phase composition. While TID aerogels show higher thermal stability and phase pure anatase nanocrystals of smaller size, EAG aerogels phase composition tunability allows preparation of nanocrystalline titania composed of both anatase and rutile crystallites. Again, without wishing to be bound by any theory, it is presently believed that presence of mixed anatase/rutile phases in titania photocatalysts leads to increased photoactivity due to formation of electronic heterojunctions on the anatase/rutile interfaces. Due to their relative conduction and valence band positions, a type II band alignment occurs at the anatase/rutile interface allowing photo-excited electrons in rutile conduction band to be transferred to anatase conduction band, while photo-generated holes in anatase valence band are transferred to rutile valence band, thus leading to effective charge separation and diminished electron-hole recombination, consequently leading to enhanced photocatalytic activity.

Finally, it bears mention again that both annealed TID and EAG silica-titania aerogels show higher activity compared to P25 and vastly outperforms the annealed P25 sample, which shows negligible photoactivity due complete phase transformation into rutile bulk crystals. Such results highlight the high photocatalytic performance of the prepared thermally stable nanostructured silica-titania aerogels, outperforming both $TiO_2$ aerogel and P25 photocatalysts. It is also remarkable that the photocatalytic activity of the material is enhanced at high temperature (1000° C.), as known $TiO_2$-based photocatalysts typically undergo large decreases in photoactivity after such harsh thermal treatment. This is the case even for previously reported thermal stable silica-titania materials, as shown in Tables 3a-3b, which summarizes and compare materials according to various aspects of the present invention to selected data from studies that systematically TABLE 3a Data summary comparing physical properties and photocatalytic behavior as function of annealing temperature of thermally stable $SiO_2$—$TiO_2$-based photocatalyst and silica-titania aerogels.

| Material and References | Specific Surface Area (BET) | $TiO_2$ Phase and Crystallite Size | Photocatalytic Behavior |
|---|---|---|---|
| $SiO_2$-doped mesoporous $TiO_2$ | 500° C.: N.R.* | 500° C.: 100% Anatase (~5 nm) | Reaction: Rhodamine 6G photodegradation |
| | 800° C.: ~120 $m^2/g$ | 800° C.: 100% anatase (~10 nm) | Highest activity achieved for sample annealed at 800° C. (Higher than P25) |
| | 1000° C.: N.R. | 1000° C.: 100% Anatase (~30 nm) | Almost complete loss of photoactivity after annealing at 1000° C. |
| $SiO_2$@$TiO_2$ aerogel (liquid deposition alkoxide based route) | As prepared: 470 $m^2/g$ | | Reaction: Methylene Blue photodegradation |
| | 600° C.: 425 $m^2/g$ | 600° C.: 100% anatase (N.R.) | Highest activity achieved for sample annealed at 600° C. (Higher than P25) |
| | 800° C.: 322 m2/g | 800° C.: 100% anatase (N.R.) | Photoactivity decreases slightly after nnealing at 800° C. |
| Ordered cubic mesoporous silica-titania mixed oxide | 400° C.: 234 $m^2/g$ | 400° C.: Mixed anatase-Rutile, Major phase anatase (5 nm) | Reaction: Methylene blue photodegradation |
| | 600° C.: 169 $m^2/g$ | 600° C.: Mixed anatase-Rutile, Major phase Anatase (6 nm) | Highest activity achieved for sample annealed at 600° C. (equal to P25) |
| | 700° C.: 110 $m^2/g$ | 700° C.: Mixed anatase-Rutile, Major phase Anatase (8 nm) | Photoreactivity decreases significiantly after annealing at 700° C. |
| $TiO_2$ quantum dots supported on $SiO_2$ foam | 500° C.: 410 $m^2/g$ | 500° C.: 100% Anatase (4 nm) | Reaction: 4-clorophenol photodegradation |
| | 900° C.: 251 $m^2/g$ | 900° C.: 100% Anatase (6 nm) | Highest activity achieved for sample annealed at 500° C. Photoactivity decreases significantly after annnealing at 900° C. |

TABLE 3b

Data summary comparing physical properties and photocatalytic behavior as function of annealing temperature of thermally stable $SiO_2$—$TiO_2$-based photocatalyst and silica-titania aerogels.

| Material and References | Specific Surface Area (BET) | $TiO_2$ Phase and Crystallite Size | Photocatalytic Behavior |
|---|---|---|---|
| $TiO_2$/$SiO_2$ nanocomposite | As-prepared: 708 $m^2/g$ | As-prepared: Mixed Brookite, Major phase anatase (5 nm) | Reaction: Congo Red photodegradation |
| | 400° C. 405 $m^2/g$ | 400° C.: Mixed anatase-Brookite, Major phase Anatase (5 nm) | Highest activity achieved for as-prepared sample |
| | 800° C.: 206 m2/g | 800° C.: Mixed Anatase-Brookite, Major phase Anatase (8 nm) | Photoactivity decreases significantly after annealing at 400° C. and 800° C. |
| $TiO_2$ supported on mesoporous $SiO_2$ | 700° C.: 118 $m^2/g$ | 700° C.: 100% Anatase (10 nm) | Reaction: Rhodamine B photodegradation |
| | 800° C.: 83 $m^2/g$ | 800° C.: 98.8% Anatase (13 nm), 1.2% Rutile (N.R.) | Highest activity achieved for sample annealed at 800° C. (Higher than P25) |
| | 900° C.: 47 $m^2/g$ | 900° C.: 96.5% Anatase (16 nm). 3.5% Rutile (11 nm) | Photoactivity decrases significantly after annealing at 900° C. |
| $SiO_2$@$TiO_2$ core-shell aerogel (TID route) | 600° C.: 526 $m^2/g$ | 600° C.: 100% Anatase (4 nm) | Reaction: Rhodamine B photodegradation |
| | 800° C.: 365 $m^2/g$ | 800° C.: 100% Anatase (5-6 nm) | Photoactivity increases after annealing at 1000° C. ($K_{obs}$: 2.4 times higher than P25) |
| | 1000D ° C.: 143 $m^2/g$ | 1000° C.: 100% Anatase (8-9 nm) | |

TABLE 3b-continued

Data summary comparing physical properties and photocatalytic behavior as function of annealing temperature of thermally stable $SiO_2$—$TiO_2$-based photocatalyst and silica-titania aerogels.

| Material and References | Specific Surface Area (BET) | $TiO_2$ Phase and Crystallite Size | Photocatalytic Behavior |
|---|---|---|---|
| $SiO_2$—$TiO_2$ composite aerogel (EAG route) | 600° C.: 374 $m^2/g$ | 600° C.: 100% Anatase (7-8 nm) | Reaction: Rhodamine B photodegradation |
| | 800° C.: 319 $m^2/g$ | 800° C.: 100% Anatase (10-12 nm) | Photoactivity increases after annealing at 1000° C. ($k_{obs}$: 3.6 times higher than P25) |
| | 1000° C.: 138 $m^2/g$ | 1000° C.: Mixed Anatase-Rutile 77-88% Anatase (14-18 nm), 12-23% Rutile (14-25 nm) | |

investigated photocatalytic activity variation as function of annealing temperature for silica-titania based photocatalysts. For example, one of the best thermally stable photocatalyst reported-to-date is the work by He et al. (C. He, B. Tian, J. Zhang, Thermally stable $SiO_2$-doped mesoporous anatase $TiO_2$ with large surface area and excellent photocatalytic activity, J. Colloid Interface Sci. 344 (2010) 382-389. doi:http://dx.doi.org/10.1016/j.jcis.2010.01.002) which detailed preparation of thermally stable $SiO_2$-doped mesoporous anatase $TiO_2$ that showed good photocatalytic activity up to 900° C., but underwent almost complete loss of activity when submitted to 1000° C. annealing in similar conditions to those used for the aerogels in the present approaches. Accordingly, the inventive materials presented herein are thus interesting choices as photocatalysts for applications that demand high temperature processing such as self-cleaning coatings, photocatalytic ceramic tiles and sintered porous ceramic membranes.

In Use

Various embodiments of the aerogels described herein may be used in catalysis, photocatalysis, photodegradation, purification, and/or any other conceivable application. For example, various embodiments are useful as a photocatalyst for energy and environmental applications such as organic pollutants photodegradation for air and water purification, photo-assisted removal of toxic heavy metals, and production of solar fuels by water splitting and $CO_2$ reduction. Importantly, the materials show outstanding thermal stability and excellent photocatalytic activity even after 1000° C. thermal treatment, making them interesting choices as photocatalysts for applications that demand high temperature processing such as self-cleaning coatings and photocatalytic ceramic tiles. Additionally, the developed non-alkoxide routes employ $TiCl_4$, a cheaper precursor as compared to commonly employed titanium alkoxides, and which allow coating of $SiO_2$ monolithic gels in one-step deposition (preparation of $SiO_2$@$TiO_2$ core-shell gels), making it more interesting than the previously reported deposition methods that require several deposition cycles to achieve the desirable titania content. Finally, these aerogels make promising candidates for applications such as sintered porous ceramic membranes for continuous flow wastewater treatment, as well as other industrial catalytic applications.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method of forming a $SiO_2$—$TiO_2$ composite aerogel using epoxide-assisted gelation, the method comprising:

forming a $SiO_2$ aerogel;

forming a mixture of the $SiO_2$ aerogel and a $TiCl_4$-derived precursor sol ($TiCl_4$ sol), wherein the $TiCl_4$ sol is comprised of $TiCl_4$ and a solvent, wherein the $SiO_2$ aerogel is in the form of $SiO_2$ aerogel particles, forming a $SiO_2/TiO_2$ wet gel, wherein an epoxide is added to the mixture of the $SiO_2$ aerogel particles and the $TiCl_4$ sol;

drying the $SiO_2/TiO_2$ wet gel; and heating the dried $SiO_2/TiO_2$ gel thereby forming a $SiO_2/TiO_2$ composite aerogel.

2. The method of claim 1, wherein forming the $SiO_2$ aerogel comprises:

forming a $SiO_2$ wet gel;

drying the wet $SiO_2$ gel to form a $SiO_2$ aerogel; and crushing the $SiO_2$ aerogel into a powder comprising the $SiO_2$ aerogel particles.

3. The method of claim 2, wherein forming the $SiO_2$—$TiO_2$ wet gel comprises adding epoxide to the mixture of the $SiO_2$ aerogel particles dispersed in the $TiCl_4$ sol for gelation of the mixture.

4. The method of claim 1, wherein the formed aerogel is a $SiO_2$—$TiO_2$ composite aerogel.

5. The method of claim 1, wherein the solvent includes a mixture of dimethylformamide and water.

6. The method of claim 1, wherein the drying comprises supercritical carbon dioxide drying.

7. The method of claim 1, wherein the heating is at a temperature in a range of about 600° C. to about 1000° C.

8. The method of claim 1, wherein the heating is at a temperature in a range of greater than 800° C. to about 1000° C.

9. The method of claim 1, wherein the $SiO_2/TiO_2$ composite aerogel is a $SiO_2$@$TiO_2$ core-shell aerogel.

* * * * *